(12) United States Patent
Kufner

(10) Patent No.: US 10,886,754 B2
(45) Date of Patent: Jan. 5, 2021

(54) ELECTRIC ENERGY STORAGE AND A BATTERY MANAGEMENT SYSTEM USED THEREIN

(71) Applicant: IdeTec GmbH, Rotthalmuenster (DE)

(72) Inventor: Walter Kufner, Munich (DE)

(73) Assignee: IDETEC GmbH, Rotthalmuenster (DE)

( * ) Notice: Subject to any disclaimer, the term of this patent is extended or adjusted under 35 U.S.C. 154(b) by 0 days.

(21) Appl. No.: 16/127,271

(22) Filed: Sep. 11, 2018

(65) Prior Publication Data

US 2019/0109469 A1 Apr. 11, 2019

Related U.S. Application Data

(62) Division of application No. 15/043,566, filed on Feb. 14, 2016, now Pat. No. 10,084,325.

(30) Foreign Application Priority Data

Aug. 16, 2015 (DE) .......................... 10 2015 010 531

(51) Int. Cl.
*H02J 7/00* (2006.01)
*H02J 7/35* (2006.01)
*H02J 7/34* (2006.01)

(52) U.S. Cl.
CPC ............ *H02J 7/0019* (2013.01); *H02J 7/007* (2013.01); *H02J 7/0021* (2013.01); *H02J 7/0024* (2013.01); *H02J 7/34* (2013.01); *H02J 7/35* (2013.01); *Y02T 10/70* (2013.01)

(58) Field of Classification Search
CPC . H02J 7/35; H02J 7/355; Y02E 60/12; H01M 10/465; H01M 16/006
See application file for complete search history.

(56) References Cited

U.S. PATENT DOCUMENTS

| | | | | |
|---|---|---|---|---|
| 5,172,009 | A * | 12/1992 | Mohan | H02J 9/062 307/105 |
| 2005/0168194 | A1* | 8/2005 | Stanesti | H02J 7/0057 320/134 |
| 2008/0143292 | A1* | 6/2008 | Ward | B60L 8/003 320/101 |
| 2013/0057222 | A1* | 3/2013 | Kim | H01M 10/4207 320/134 |

* cited by examiner

*Primary Examiner* — Arun C Williams

(57) ABSTRACT

The present invention provides a battery management system and an electric energy storage equipped with the battery management system, which enable the adjustment of one or more variable connection voltages. In particular the energy storage of the present invention may provide highly dynamic varying output voltages, for instance in the form of an AC voltage. In this way energy storages may, for instance, be directly operated in connection with an electric power grid or may establish electric AC power grids.

11 Claims, 8 Drawing Sheets

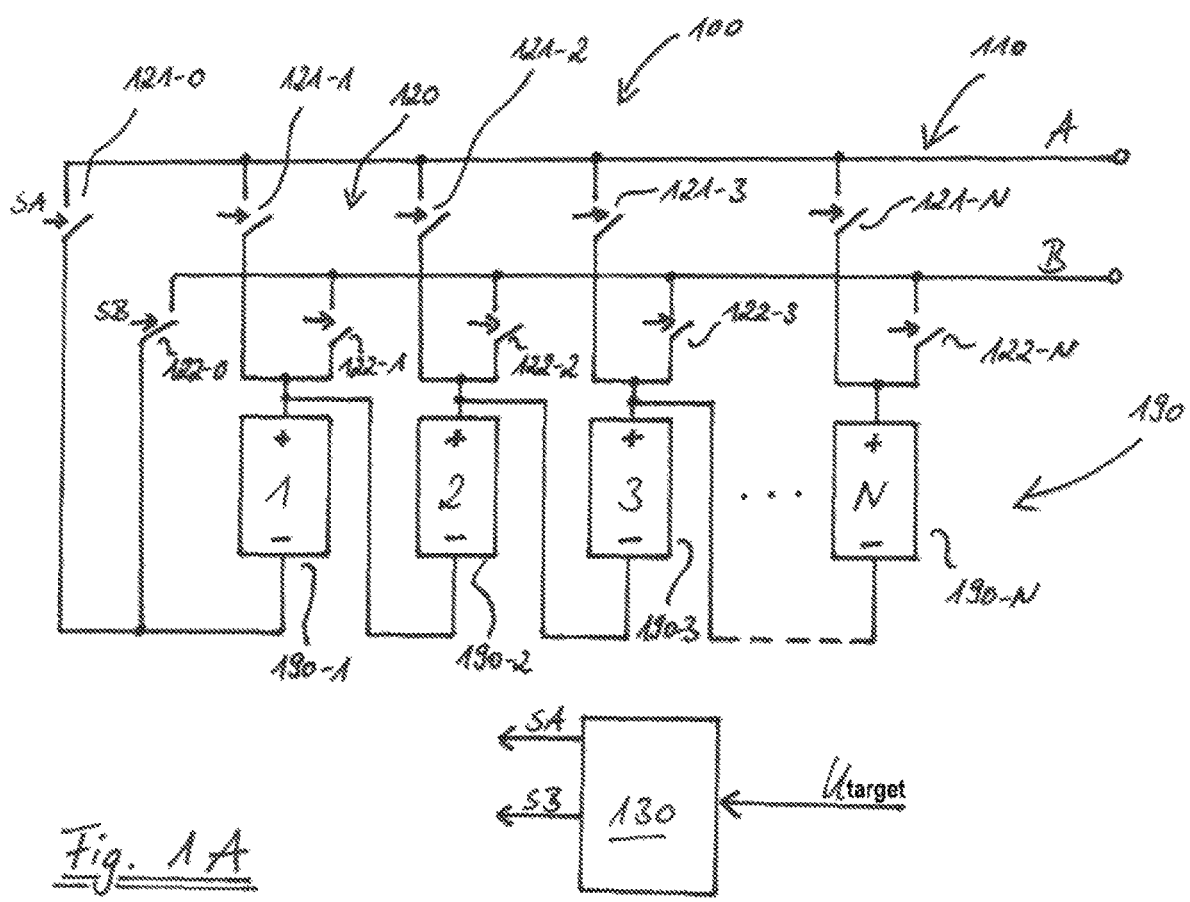

A: 0100...0

B: 0001...0

C: 0000...1

D: 1000...0

A: 1000...0
B: 0001...0
C: 0000...1

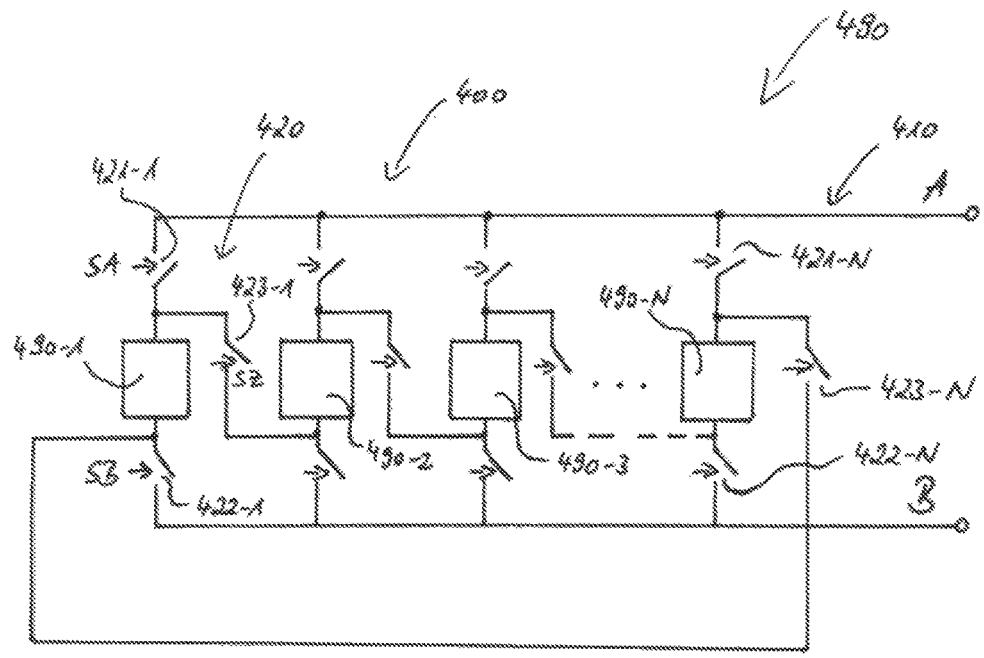
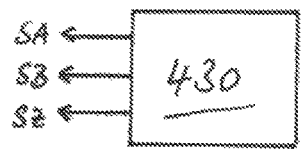
Fig. 4A
Fig. 4B  A: 111...1
B: 111...1
Z: 000...0
Fig. 4C  A: 010...1
B: 101...0
Z: 100...0
Fig. 4D  A: 010...0
B: 000...1
Z: 1X0...1

A: 010 ⇒ 001
B: 100    100

ELECTRIC ENERGY STORAGE AND A BATTERY MANAGEMENT SYSTEM USED THEREIN

CROSS-REFERENCE TO RELATED APPLICATIONS

The present application claims priority of the German patent application with application number DE 10 2015 010 531.0 filed with the German Patent and Trademark Office on Aug. 16, 2015.

BACKGROUND

The present invention generally relates to storing electric energy by means of electrochemical storage units, capacitors with and without electrochemical components and the like, which are capable of at least supplying and possibly storing electric energy. For simplicity in the following such energy storages are referred to as electric energy storages.

Electric energy storages in the form of accumulators, capacitors or a mixture of these two components are increasingly gaining in importance in industry and private homes, since for instance the growing local generation of electric energy, frequently performed irrespective of demand according to the environmental conditions such as sun, wind, and the like, requires electric energy to be stored in times, in which excess electric energy is available. In this respect currently existing power grids are increasingly facing the problem that load peaks in industry and private homes may no longer be covered due to an imbalance between peaks of generation of regenerated energy and the actual load peaks, unless providing appropriate storage devices are provided. Also electric energy storage systems represent essential components in mobile applications that allow a desired level of mobility for a large number of applications due to the increasing performance of the energy storage systems. Examples for mobile applications of energy storages include small appliances, such as phones, mobile computers in any variation and the like. A further example for the application of efficient electric energy storages is electro mobility, which is gaining in importance and whose further growing significantly depends on the characteristics of the electric energy storage, such as the available storage capacity, the amount of power output and usable lifetime of the electric energy storage.

Generally, a plurality of electro chemical systems is available that are used for the construction of an electric energy storage, the difference being in particular the type of electrolyte materials used, materials of electrodes and the like. Presently, well established electrochemical energy storages based on lead are increasingly replaced with energy storages, such as accumulators on the basis of lithium, nickel metal hydride and the like. Electrochemical energy storages on the basis of lead are still widely used in mobile applications, such as in the form of batteries for vehicles, drive batteries for forklift trucks and the like, and are particularly frequently used as stationary battery systems for supplying stand-alone devices or as emergency power plant. Irrespective of the configuration of such accumulator systems, which will be referred to hereinafter simply as battery systems, it is extremely important, depending on the type of electric energy storage, to monitor the current operating state of the electric energy storage and possibly manipulate the state in order to maintain a long lifetime at the required output and input of electric energy and electric power, respectively.

Typically, the battery systems are built up from individual cells or blocks, which have a rated voltage depending on the specific design in order to obtain a desired total voltage as connection voltage of the battery system. Frequently a plurality of cells of the same type is connected in parallel to obtain a desired current rating. By parallel connection of individual cells typically a common connection voltage is obtained for this block of parallel-connected cells, thereby typically not requiring an individual monitoring of the connection voltage of each individual cell. Since the connection voltage of an individual cell does typically not correspond to the desired rated voltage of the battery system a plurality of cells or blocks, which may possibly include several parallel-connected units, are connected in series, thereby obtaining the desired rated voltage. In a series connection of individual blocks the input current or output current flows through each cell or block so that the current load is identical for each cell or block, while the resulting connection voltage corresponds to the sum of voltages of the individual blocks, which is typically correlated with the state of charge.

Upon repeatedly charging and discharging a portion of the stored electric energy or the total energy an increasing discrepancy of the individual voltages may be observed due to variations of the individual blocks, thereby increasing the risk for obtaining a growing difference between individual voltages of cells or blocks, thereby resulting, upon performing further cycles, in increasing differences in the state of charge, which may finally lead to overcharging, deep discharging or even polarity reversal of individual blocks and cells.

Therefore great efforts are being made in order to monitor appropriate parameters for charging and/or discharging of a battery system so as to obtain information on the current state of the battery system. To this end, for instance, current and voltage of individual cells or blocks are monitored in order to estimate the state of charge of each individual block or each individual cell on the basis of the input and output energy and/or on the basis of the currently determined connection voltage. Since also environmental factors, such as temperature, humidity, and the like, significantly affect the operation of the battery system, frequently also these parameters are monitored and evaluated so as to possibly take appropriate countermeasures, thereby contributing to higher performance and/or increased lifetime of the battery system. To this end electronic systems, hereinafter referred to as battery management systems, are increasingly used, which at least monitor certain characteristics of the battery system and possibly control the operation of the battery system. As an example, in some battery systems, in which overcharging may be a potential danger, a corresponding regulation of the charge current is performed such that a hazardous state of the battery system may be prevented. In other cases active and/or passive heating and/or cooling systems are provided so as to maintain the operating temperature within a specified range. Typically, such battery management systems also monitor the voltage of individual cells or blocks and indicate a state, in which a too pronounced deviation between the individual connection voltages occurs. Furthermore, in many battery management systems appropriate means are provided so as to achieve a charge balance or at least an adaptation of the state of charge of individual cells or blocks. Although such battery management systems typically allow an extended lifetime of the corresponding battery systems they nevertheless increase overall complexity of an electric energy storage, however, without significantly contributing to enhanced flexibility with respect to applicability of the electric energy storage.

It is therefore an object of the present invention to provide means in the context of electric energy storages, which allow, by using electronic components, an increased level of flexibility in the adaptation of electric energy storages to the use profile of external electric components.

SUMMARY

According to one aspect of the present invention the above-identified object is solved by a battery management system comprising a terminal arrangement that is connected to an electric energy storage having a plurality of energy storage blocks. The terminal arrangement is configured to exchange electric energy between the electric energy storage and a further external component. The battery management system further comprises a switch assembly connected to the terminal arrangement and being connectable to each of the plurality of energy storage blocks and being configured to set or adjust, controlled by a control signal, an electric configuration of the energy storage blocks that is appropriate for providing one or more rated voltages. Moreover, the battery management system comprises a controller configured to provide the control signal used to set the electric configuration.

The battery management system of the present invention includes appropriate means, that is, the terminal arrangement and the switch assembly, which upon connection with the plurality of energy storage blocks facilitate an appropriate electric configuration of these energy storage blocks for providing one or more rated voltages. That is, the switch assembly is, at the one hand, capable upon being connected to the plurality of energy storage blocks to set or adjust the electric configuration, that is, the series connection and/or parallel connection, on the basis of the control signal provided thereto, such that one or more desired rated voltages are available at the terminal arrangement. On the other hand, the switch arrangement is also capable to convey the electric energy or power required for the respective rated voltage so that one or more external components connected to the terminal arrangement may be supplied with the required power. That is, the battery management system of the present invention is able, upon setting or adjusting an appropriate electric configuration, to provide one or more rated voltages depending on the control signal such that upon appropriate provision of the control signal a high level of flexibility with respect to the adaptation of the electric energy storage to one or more external components is achieved. Hence, when the characteristics or the operating state of the one or more external components change, no further electronic or electric means are required in order to obtain an optimized adaptation between energy storage and external component. For example, it is well known that the operating state, i.e., output voltage, available energy and power of the energy storage, may significantly vary upon a change of the environmental conditions. By appropriate selection of the electric configuration of the plurality of energy storage blocks by the battery management system of the present an adaptation to the currently prevailing operating state is achieved without requiring further components. In other applications it is possibly necessary to adapt the rated voltage with respect to maintaining or improving the operating behaviour of an external component, when the currently used rated voltage of the electric energy storage may tend to fall below a specific threshold value due to the state of charge. Furthermore, upon replacing one or more of the external components to be connected to the electric energy storage a change of one or more rated voltages may be necessary in order to ensure a desired operating behaviour.

In this respect it should be appreciated that an energy storage block refers to an individual "smallest" entity of the electric energy storage, which may in turn be composed of a plurality of cells in a series and/or parallel connection, which may, however, in the context of the battery management system of the present invention be understood as a base unit. Although the individual energy storage blocks may have different characteristics, for instance with respect to rated capacity, rated voltage, configuration of the block, and the like, in preferred embodiments the energy storage blocks are substantially identical, that is, they are of the same building type and preferably have the same rated capacity, the same rated voltage and the like. For example, for a battery system based on lead an energy storage block may have the rated voltage of 2 V (Volts), which basically corresponds to the rated voltage of a lead cell. The required capacity may be adjusted by connecting in parallel an appropriate number of base cells and/or by using larger cells having a corresponding size. If a coarser "granularity" of the adjustable rated voltages is sufficient an energy storage block of a battery system based on lead may have a rated voltage of 4 V, 6 V, 8 V, 10 V, 12 V, . . . . In other examples the rated voltage of one energy storage block is for example 1.2 V for nickel metal hydride systems or approximately 3 V to 4 V for battery systems based on lithium.

It should be appreciated that the term "rated voltage" refers to a standardised value for a corresponding cell technology, wherein the actual value of the connection voltage strongly depends on the state of charge of the respective cell technology. Typically, for the respective cell technology appropriate minimum and maximum values are specified that a corresponding cell is not to exceed or fall short of.

In a further advantageous embodiment the switch assembly is configured to set the appropriate electric configuration on the basis of a permanent or a switchable series connection of the plurality of energy storage blocks. In this embodiment the switch assembly is therefore configured such that a series connection is provided as a base circuit and the desired electric configuration and thus the one or more rated voltages at the terminal arrangement is set or adjusted on the basis of the series connection of the plurality of energy storage blocks. This is particularly advantageous in applications, in which relatively high currents are required, since the basic series connection of the plurality of energy storage blocks may be provided on the basis of connections having a low ohmic resistivity and the electric configuration is set or adjusted by using a reduced number of switching devices of the switch assembly by taking advantage of the given series connection. For example, the corresponding electric configuration may consist of individual sections of the series connection that are appropriately connected with the terminal arrangement such that the one or more desired rated voltages are obtained. In a further option of this embodiment a switchable series connection of the plurality of energy storage blocks is provided, that is, switching elements may be provided between an plus pole and minus pole electrically adjacent energy storage blocks, which are part of the switch assembly so that a large number of elected configurations may be achieved for a given number of switching devices. For example, in this case a parallel connection of individual energy storage blocks or of a plurality of energy storage blocks connected in series may be obtained. The parallel connection of individual blocks or of all of the energy storage blocks may be advantageous in certain operating phases to achieve a charge balance between the individual blocks without requiring further means for monitoring and/or providing charge balancing.

In one advantageous embodiment the electric configuration of the plurality of energy storage blocks in the battery management system is adjustable such that two or more rated voltages are concurrently present at the terminal arrangement. The provision of two or more rated voltages from a single electric energy storage is frequently of particular advantage in applications in which two or more components are connected to the energy storage. For example, regenerative energy sources, such as photovoltaic systems, wind power, water power, and the like already have great importance for the energy supply and will increase in importance in the future so that in particular an efficient exploitation of electric energy storages in combination with such equipment may contribute in total to an increased efficiency for the generation of regenerative energy. If for example regenerative energy is consumed only partially during certain phases in combination with an electric energy storage there is the possibility to temporarily store excess energy and output the same on demand. To this end, one rated voltage of the electric energy storage may be adjusted in such a manner that the rated voltage is for example adapted to the output voltage of a photovoltaic generator, while a second rated voltage is adjusted such that it serves for the supply of a load, for instance an inverter for feeding into an AC voltage grid, for operating other loads, for feeding into a regional power grid, and the like. In other cases, frequently a plurality of external components, such as photovoltaic generators, wind power stations are to be coupled with a single energy storage, wherein at different times significantly different requirements with respect to the rated voltage of the energy storage are to meet. In such situations a dynamic adaptation of the rated voltage according to the present invention contributes to an increase in efficiency of the electric energy storage.

In a further embodiment at least one of the one or more voltages provided at the terminal arrangement is a time-varying rated voltage. In this embodiment the battery management system is configured to dynamically change the electric configuration such that one or more of the rated voltages provided at the terminal arrangement also vary in time. In this manner the battery management system may respond to changes with respect to requirements of the one or more rated voltages within a timescale in the range of milliseconds and less to several seconds. Variations that require an adaptation of the rated voltage in a time frame of several seconds to an arbitrarily long time interval may not be considered as time-varying rated voltages in the context of the present invention. For example, typically the adaptation of the rated voltage with respect to a variation of the operating characteristics of a photovoltaic generator is in the order of magnitude of several seconds to several minutes and thus would not be considered as a time-varying rated voltage. However, the present invention is configured according to the above-described embodiment to respond to fast changes or requirements by varying one or more of the rated voltages by dynamically changing the electric configuration within the timeframe mentioned above. For example, electric machines, such as synchronous machines, asynchronous machines, brushless DC machines, and the like are frequently used such that different operating modes may be selected, such as different speeds. To this end, inverter units are used which frequently operate on the basis of a "constant" intermediate circuit voltage. Form this intermediate circuit voltage, which thus represents the maximum available DC voltage, the required effective voltage is adjusted by clocked switching of the motor windings. Since the required clock frequency is frequently in the range of several kHz (kilo Hertz) to 20 kHz, significant losses in the soft magnetic materials of the electric machines may occur, since typically the soft magnetic materials are intended for an operation at several 100 Hz. By providing a dynamic intermediate circuit voltage in the form of an appropriately set voltage at least switching losses may be avoided or at least reduced. In other inverter topologies, in which a variable intermediate circuit voltage is used, the transformer device required therefor may be omitted according to the present invention. In particular in mobile applications, for instance in electric vehicles, the provision of a varying input voltage for the one or more inverters of the one or more motors may contribute to a reduction of the switching losses in the inverter and the motor, since only the switching events required for the rotating field have to be carried out in the inverter. In this manner in total the stress on the insulation, bearings and the like may possibly be reduced with respect to the motors used, irrespective of whether they are used in stationary or mobile applications. Although certain switching losses may also occur in the battery management system, these losses, however, may be significantly less and may, in total, result in a reduced power loss in the drive system. In particular in mobile applications this may contribute to an increased running time for a given battery capacity. When two or more time-varying rated voltages are provided at the terminal arrangement two or more electric machines may, for instance, be operated independently from each other by the provision of respective variable intermediate circuit voltages in a speed dependent manner, wherein single battery storage is sufficient. This may contribute to an entirely increased efficiency in particular in electric vehicles.

In a further particular embodiment the time-varying rated voltage has the characteristics of an AC voltage. That is, the battery management system of the present invention provides at least one rated voltage having the characteristics of an AC voltage and thus being appropriate for supplying an AC voltage load. For example, the controller of the battery management system may dynamically vary the electric configuration such that an AC voltage is obtained that is appropriate for supplying an electric power grid without requiring additional measures, such as an inverter. Moreover, electric machines or generally AC loads, such as charging devices, grid power devices and the like may be used in combination with an energy storage equipped with the battery management system. Moreover, coupling with an electric power grid is possible so that an energy exchange between the power grid and the electric storage in both directions may be achieved without any rectifier or inverter coupled in between. Of course conventional low frequency transformers may be used, when a galvanic decoupling between energy storage and power grid is required. In other applications a rated voltage may be provided in the form of a DC voltage adapted to the requirements, for example for coupling with a photovoltaic generator, while on the other hand energy in form of an AC voltage may be fed into the power grid or one or more AC loads may be operated by the energy storage.

In one advantageous embodiment two or more time-varying rated voltages in the form of AC voltages are generated such that several AC voltages independently from each other and/or AC voltages having desired mutual phase behaviour may be provided. For example, a 2- or 3-phase grid may be provided on the basis of single electric energy storage such that in particular efficient stand-alone power grids may be generated without further external components. In advantageous embodiments the two or more rated voltages provided as AC voltages are configured for the operation of one or more electric machines. As for instance described above, a desired electric power grid, such as a 3 phase grid may be generated such that conventional electric machines, such as synchronous machines, asynchronous machines, and the like, may be operated in connection with this 3 phase grid. In other use cases the time-varying rated voltages are provided in the form of AC voltages such that an operation of an electric machine with a variable speed is accomplished. To this end, the frequency and/or the amplitude of the "AC voltages" is appropriately varied in order to for instance adjust the speed of the synchronous machine or asynchronous machine in a desired manner. In this manner speed-variable drives may be provided without using an inverter, wherein the stress of the electric machine due to magnetising and switching losses is significantly reduced compared to conventional inverter based drives. By providing an appropriate filter assembly, such as an inductance, a capacitor or a combination thereof, in combination with an appropriate switching algorithm, as will be discussed in more detail later on, the rated voltages may be provided as AC voltages that contain a reduced amount of harmonics, such that significantly less demanding requirements are to be met on the side of the electric machine with respect to insulation, bearings and the like. This may be particularly advantageous in mobile applications, since an increased power dissipation and exposure of the insulation to high-voltage peaks make not only result in a reduced lifetime of the drive components but also in a reduced mileage.

In a further advantageous embodiment the controller of the battery management system is further configured to set or adjust the electric configuration in relation to the state of charge of the plurality of energy storage blocks. In this way not only diverse requirements with respect to the rated voltage are taken into account, but also the generation of an appropriate electric configuration for a desired rated voltage is achieved in view of a target state of charge of each of the energy storage blocks. As already indicated above it is often desirable to balance the state of charge of the plurality of energy storage blocks as much is possible so that a "divergent behaviour" of the electric characteristics of the individual energy storage blocks during the usable lifetime of the energy storage may not occur or is minimised. To this end the battery management system of the present invention may monitor the voltage and/or the input current or output current of the plurality of energy storage blocks and may select, on the basis of the corresponding monitoring results, an appropriate electric configuration that results in the desired rated voltage. For example, in many cases the desired rated voltage may not correspond to the rated voltage that corresponds to a series connection of all energy storage blocks. In this case several electric configurations are available that lead to the same rated voltage. For example, for achieving a desired electric configuration certain blocks may be connected in parallel in order to reduce the load for a single block and to provide the possibility for a charge balance. In other variants of the present invention, in which a permanent series connection between the plurality of energy storage blocks is provided, that magnitude of the rated voltage is adjusted such that only certain sections of the series connection are connected to the terminal arrangement, when the desired rated voltage is less than the maximum available rated voltage, wherein, however, for providing the same rated voltage different electric configurations are available, thereby providing, at least within a certain range, the possibility of using different electric configurations in order to obtain a certain balance of the state of charge during operation. Moreover, during phases, in which no particular requirements for the rated voltage or for the power output or input power of the electric energy storage are to be met, a mode of operation may be selected, in which a balance of different states of charge is efficiently achieved. For example, in phases without or with merely reduced energy exchange, in particular in mobile applications when turning off the drive, a charge balance may be carried out between the individual energy storage blocks. For example, when the drive battery of the electric vehicle is disconnected from the drive, for instance during standstill of the vehicle, and appropriate voltage may be provided at the terminal arrangement that is used for charge balancing of the individual storage blocks. This voltage may be generated internally or externally. Also, during charging the drive battery of a vehicle a second voltage, either generated internally or externally, may be used so as to perform charge balancing between individual blocks by means of the terminal arrangement.

In stationary applications, in which for example the energy input into the energy storage may strongly vary, for example for a photovoltaic generator, a wind power station, and the like, the electric configuration may be selected such that one or more energy storage blocks may be charged more intensively compared to others in a specific manner in order to obtain, in total, a balanced charge state across the plurality of energy storage blocks. In particular for photovoltaic generators an adaptation to the voltage of an individual energy storage block or to two or more of the plurality of energy storage blocks is readily achievable by connecting the photovoltaic generator or any part thereof to a block or the blocks under consideration, without substantially changing the total current. Undue reduction of the total energy production of the generator may, however, be avoided by appropriately selecting the point in time. That is, such phases of operation may be selected, in which only low power is obtained from the photovoltaic generator, for example in the morning, in the evening, for a clouded sky, and the like, so that operation of the generator outside of an optimal operating range, i.e., upon coupling the generator to an individual storage block or to only some few storage blocks, may not result in a significant reduction of the total energy production, while on the other hand, an efficient balancing of the individual states of charge of the plurality of energy storage blocks may be achieved.

In one advantageous embodiment the controller of the battery management system is configured to set or adjust the electric configuration by considering an operating mode to be adjusted for the one or more further external components connected to the terminal arrangement. In this way it is possible to adjust the operating state of one or more components connected to the energy storage in a desired manner without requiring additional means, such as an inverter and the like. In applications, in which one of the several external components is a photovoltaic generator, a wind power station, a water power station or the like, the setting of the rated voltage is achieved such that a desired operating behaviour, such as maximum feeding of electric energy, and adaptation of torque and speed, and the like, is achieved. When coupling the energy storage with an electric power grid by setting of the rated voltage, for instance of the amplitude, it may be changed between feeding into the power grid and receiving energy from the power grid, as is desired for the respective mode of operation. Also, for speed-variable drives a corresponding target value for speed and/or torque may be generated by the controller or may be received from outside so that an appropriate output of the rated voltage is obtained.

According to a further aspect of the present invention the above-identified object is solved by an electric energy storage that includes a plurality of energy storage blocks, each of which contains a part of the electric energy of the energy storage. The electric energy storage further comprises a battery management system, as described above or as will be further described in the following detailed description, wherein the battery management system is connected to the plurality of energy storage blocks by means of the terminal arrangement and the switching assembly. The electric energy storage of the present invention has, due to the battery management system, the property to allow adjustment of the electric configuration of the energy storage blocks in a desired manner, as is also described above, so that a high level of flexibility is achieved for the adaptation of the energy storage to a corresponding application. In some embodiments at least parts of the battery management system, such as the terminal arrangement and the switching assembly, are incorporated in an appropriate casing or support structure together with the energy storage blocks so that, for instance, the switching assembly may use the possibly provided further infrastructure of the electric energy storage, for instance in the form of a cooling system, and the like in order to dissipate the power losses caused by the switching operations or to heat the energy storage blocks. Moreover, in this manner, the various switching devices, such as transistors, and the like, may be arranged in close proximity to the energy storage blocks so that, except for the intrinsic transmission losses of the switching elements, unnecessary ohmic resistivity may be avoided. This may be particularly advantageous in applications, in which the electric energy storage has to absorb or provided at least temporarily high electric power.

According to a further aspect of the present invention the above-identified object is solved by a method for operating an electric energy storage having a plurality of energy storage blocks. The method comprises determining one or more rated voltages of the electric energy storage for supplying one or more external electric components. Moreover, the method comprises adjusting an electric configuration of the plurality of energy storage blocks on the basis of the determined one or more rated voltages by means of a switching assembly connected to the plurality of energy storage blocks. Finally, the method comprises providing one or more connection voltages corresponding to the one or more rated voltages at a terminal arrangement connected to the switching assembly. Also in this case the concept is implemented that one or more desired rated voltages and thus connection voltages may be achieved by adjusting a respective equivalent electric configuration of the plurality of energy storage blocks. Preferably, the one or more rated voltages are determined by taking into consideration a desired or current operating status of at least one of the one or more external components. This is advantageous since, as discussed above, controlling the one or more external components may be achieved by providing the rated voltages that are appropriate for the desired or current operating status without requiring any additional controlling components.

In a further advantageous embodiment the electric configuration of the plurality of energy storage blocks is set by considering the state of charge of the plurality of energy storage blocks. For example, the electric configuration may be determined such that a balancing of the respective states of charge is achieved as efficiently as possible. In other applications or situations it may be necessary to avoid or reduce a load for one or more of the plurality of energy storage blocks, for instance due to an error in the energy storage block, without entirely jeopardising usability of the electric energy storage.

BRIEF DESCRIPTION OF THE DRAWINGS

Further illustrative embodiments are described in the following detailed description while also referring to the accompanying drawings, in which:

FIG. 1A schematically illustrates a battery management system and an electric energy storage connected thereto according to one embodiment of the present invention, FIGS. 1B to 1E show representations of the electric configurations of the energy storage of FIG. 1A, FIGS. 4B to 4D illustrate exemplary electric configurations.

DETAILED DESCRIPTION OF EXEMPLARY EMBODIMENTS

Figure 2A:
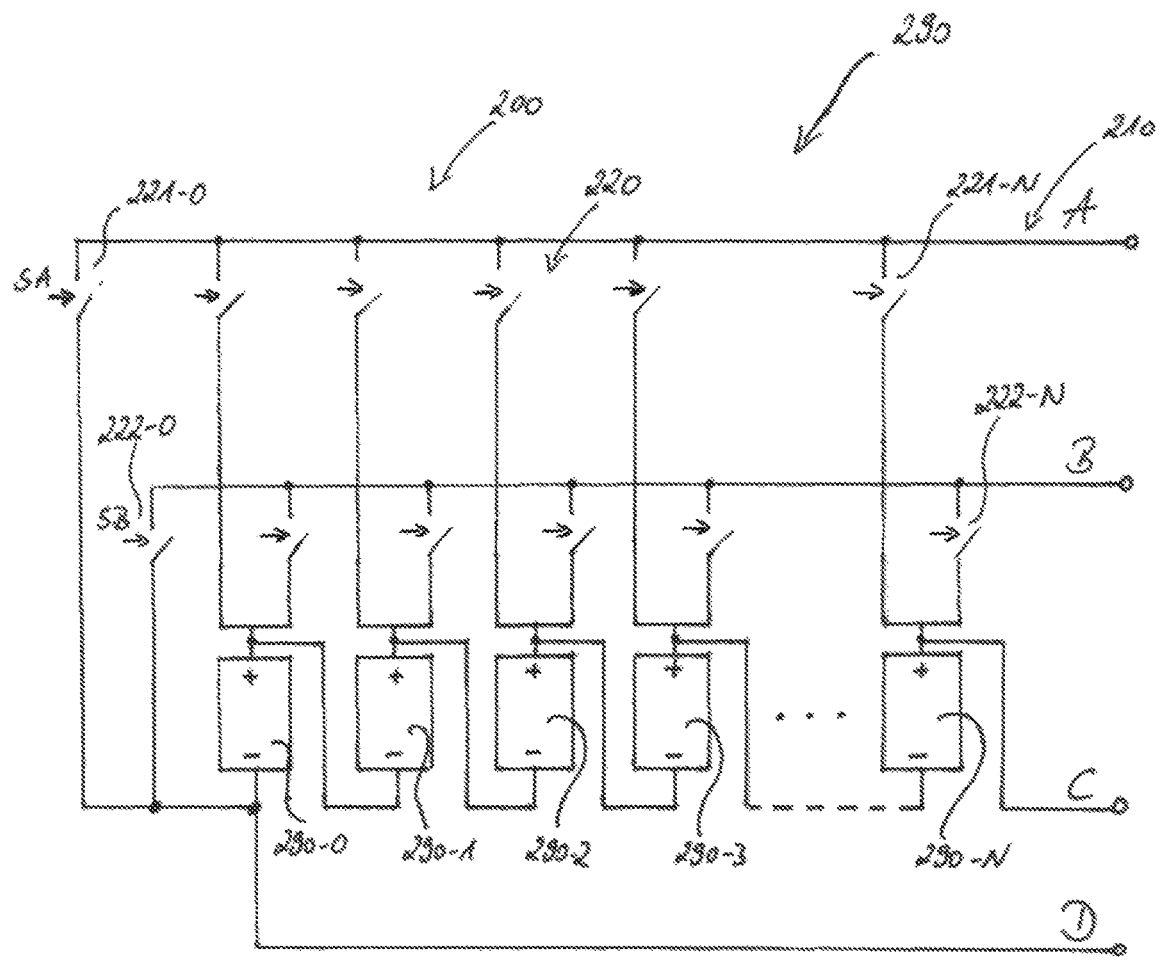
FIG. 2A illustrates a further embodiment of a battery management system and an electric energy storage.

FIG. 1A illustrates a battery management system 100 according to one embodiment of the present invention. The battery management system 100 comprises a terminal arrangement 110 including, in the embodiment shown, a conductor or terminal A configured as an appropriate current rail or the like, and a conductor or terminal B also configured as an appropriate current rail and the like, so that an appropriate connection voltage may be provided across the conductors A and B in order to supply a corresponding load (not shown). It should be appreciated that the conductors A, B are to be understood so as to also include terminal contacts that may be connected in an appropriate manner with a load. The term "load" is to be understood as a component that is able to receive energy and/or provide energy, depending on the operating state of the load. The battery management system 100 further comprises a switching assembly 120 that is connected to the terminal arrangement 110. Furthermore, the switching assembly 120 is connectable to a plurality of energy storage blocks 190-1, 190-2, 190-3, . . . 190-N so that, depending on the internal state of the switching assembly 120 and depending on the general electric configuration of the energy storage blocks 190-1, ..., 190-N a corresponding rated voltage is obtained at the terminal arrangement 110. In the embodiment shown the energy storage blocks 190-1, ..., 190-N are connected in series, which is also referred to herein as a "permanent" series connection, since this series connection cannot be changed by the switching assembly 120. Such a permanent series connection of the energy storage blocks is advantageous in embodiments, in which, for instance, mainly a series connection of several energy storage blocks is to be used for adjusting or setting a desired rated voltage at the terminal arrangement 110 and wherein the low ohmic connection between the individual energy storage blocks is considered advantageous. In other embodiments, as described later on, that switching assembly 120 is configured to allow a controllable series connection, at least of individual energy storage blocks, and a parallel connection.

The energy storage blocks 190-1, ..., 190-N represent any type of an energy storage, such as battery cells that are appropriate for merely providing energy, accumulator cells capable of providing and receiving energy, capacitors of appropriate capacitance and the like. In advantageous embodiments all of the energy storage blocks are of the same type, such as accumulator cells of identical configuration and the same capacity, while in other embodiments also different types of energy storage blocks may be used, and this fact may be taken into consideration upon operating the battery management system 100. In particularly advantageous embodiments the number of energy storage blocks is greater than three storage blocks and is preferably selected such that the maximum adjustable rated voltage corresponding to the series connection of the N storage blocks in the embodiment shown is sufficient to provide a desired maximum connection voltage at the conductors A, B. As already indicated above the rated voltage typically depends on the state of charge of the individual energy storage blocks so that in advantageous embodiments the number of energy storage blocks is selected so as to achieve the required connection voltage even at a low state of charge. If for example a maximum connection voltage of 200 V is required during operation of the battery management system 100 irrespective of the actual state of charge of the energy storage blocks and if the rated voltage of one energy storage block is, for instance, 2 V, while the actual connection voltage of one energy storage blocks is allowed to drop to 1.8 V, then preferably at least 112 energy storage blocks are provided. Of course the capacity as well as the further properties of the corresponding energy storage blocks have to be adapted to the intended application of the battery management system which, in connection with the energy storage blocks 190-1, ..., 190-N, forms an energy storage 190 according to the present invention. As already discussed above the energy storage blocks themselves may be composed of several subunits that are connected in parallel and/or in series depending on the intended load capacity, output voltage, "granularity" of the connection voltage and the like.

The switching assembly 120 comprises a plurality of switching devices 121-1, ..., 121-N, which are individually appropriately controllable by a control signal that for simplicity is collectively referred to as SA. The switching devices 121-1, ..., 121-N connect the terminal arrangement 110, in this case the conductor A, to the energy storage blocks 190-1, ..., 190-N, respectively. In the embodiment shown the switching device 121-0 is connected with the minus pole of the energy storage block 190-1, the switching device 121-1 is connected with the plus pole of the energy storage block 190-1, the switching device 121-2 is connected with the plus pole of the energy storage block 190-2, ..., and the switching device 121-N is connected with the plus pole of the energy storage block 190-N. Similarly, the switching assembly 120 comprises switching devices 122-1, ..., 122-N for connecting the energy storage blocks with the terminal arrangement 110, i.e. the conductor B in a controllable manner. The corresponding control is accomplished by a control signal SB supplied to the switching devices. In the embodiment shown the switching device 122-0 is connected with the minus pole of the energy storage block 190-1, the switching device 122-1 is connected with the plus pole of the energy storage block 190-1, the switching device 122-2 is connected with the plus pole of the energy storage block 190-2, ..., and the switching device 122-N is connected with the plus pole of the energy storage block 190-N. The switching devices of the switching assembly 120 may be provided as any appropriate switching elements, for instance in the form of electro mechanical components when activation of the switching devices in the switching assembly 120 occurs at low frequently. In other embodiments preferably in addition to or alternatively to electromechanical elements other types of switching elements may be used on the basis of semiconductor devices, in particular when short switching times and relatively high switching frequencies of several 100 Hz up to several 10 kHz are to be applied. Semiconductor-based switching elements may be provided, for instance in the form of thyristors, bipolar transistors with insulated gate (IGBT), bipolar power transistors, power MOSFETs and the like. It should be noted that many semiconductor-based switching elements are conductive in the reverse direction or may accept only a small voltage in the reverse direction so that an appropriate combination of two semiconductor elements that conduct in the reverse direction may be used so as to obtain the effect of a switch that may disconnect current flow in both directions when such a bidirectional disconnection is required due to the respective circuit topology. Appropriate arrangements for the switching devices 121, 122 will be discussed later on in more detail.

Moreover it is to be noted that the control signal SA, SB required for controlling the switching devices 121, 122 are provided in any appropriate form so that these signals themselves may trigger the switching activity in the individual switching devices, while in other embodiments the switching devices may comprise appropriate means in the form of drivers, and the like, to generate appropriate driver signals from the control signal is supplied thereto, which may then trigger the actual switching activity. In some embodiments the control signals SA, SB are provided such that a desired switching device selectively performs a switching activity without requiring any further electronic devices. If, for example, the switching devices are electromechanical components it is sufficient to selectively supply an appropriate driving power in the form of appropriate voltage and current so as to trigger the switching activity wherein the electromechanical element may be self-conserving such that only energy required for triggering of the switching activity has to be supplied. For controlling semiconductor-based switching elements typically an isolated drive signal may be required since the switching elements typically are at different potentials. This may, for instance, be accomplished by respective transformer elements so that the corresponding secondary voltage of a transformer is supplied to the respective switching elements of a switching device to trigger the switching activity. In other embodiments the corresponding control signals SA, SB only include information that a switching elements is to be activated, whereas the actual preparation of driver signals is accomplished within the switching device itself comprising, for instance, an appropriate voltage supply and appropriate means for evaluating the control signals SA, SB. In still other embodiments the corresponding information for performing a switching activity is conveyed together with the energy required for the actual controlling and the conditioning of the actual driver signals is accomplished in the switching device.

It should be appreciated that in the embodiment illustrated the switching devices 121, 122 are illustrated such that only two different switching states are allowable for setting a desired electric configuration of the energy storage blocks. As will be discussed later on in more detail in some embodiments the switching devices 121, 120 or at least some of these devices are configured such that at least during certain transient phases of the switching activity an energy flow is possible in one direction only, thereby for instance allowing a continuous current flow between the conductors A and B when, for instance, inductive loads are to be switched, and the like.

The control signals S, SB collectively referred to as the "control signal" are provided by a controller 130 that includes any necessary means for this purpose. The controller 130 may represent a stand-alone control component in the form of a microprocessor and the like that appropriately provides the control signal according to an implemented control algorithm in order to set or adjust the electric configuration of the energy blocks 190, which may be accomplished by taking into consideration various constraints. Such a constraint is, for instance, the rated voltage to be provided at the terminal arrangement 110, which in turn may be selected by taking into consideration the actually required connection voltage. The information required for the application of an appropriate rated voltage at the terminal arrangement 110 may be determined within the controller 130 itself, may be stored or may be provided in any other way and/or may be provided externally, for instance in the form of a target voltage to be provided in the form of the connection voltage at the terminal arrangement 110, or in the form of other parameters that are appropriate for operating a load of the energy storage 190, as will be discussed in more detail later on. It should be appreciated that the controller may determine an appropriate electric configuration in real time on the basis of an implemented control procedure when the structure of the switching assembly and of the terminal arrangement is stored in the controller. In other embodiments any practical selectable configurations are stored within the controller, for instance in the form of a table with a correspondence to the respective rated voltage so that, for instance, upon requesting a desired rated voltage the appropriate configuration is selected from the table and the associated correspondence. As will be discussed later on the control procedure implemented in the controller may also read measurement values, such as current measurement values, on a regular basis and may update the charge balance of each storage block. The control procedure is then preferably configured such that upon selecting an appropriate electric configuration also the momentary charge balance of the storage blocks involved in the respective configuration and the momentary energy flow direction are read out and are taken into consideration during the selection procedure.

As already discussed the controller 130 may be configured, for instance by appropriate drivers and the like, to provide the control signal in the form of the signals SA, SB such that a respective switching element is directly controlled by the control signal for carrying out the switching activity, or the switching assembly 120 is configured to appropriately evaluate the control signal SA, SB supplied via an appropriate bus configuration and to generate the required driver signals for driving the respective switching elements. For example, in some embodiments the switching assembly 120 may comprise sufficient "intelligence" in the form of computational resources and memory so that only the electric configuration or the time sequence of several successive electric configurations are conveyed via the control signal SA, SB by the controller 130 and the corresponding evaluation and conditioning of the actual driver signals is accomplished in the switching assembly 120.

The rated voltage supplied by the switching assembly 120 at the terminal arrangement 110 is effected by the electric configuration of the energy storage blocks 190-1, . . . , 190-N, wherein the corresponding electric configuration is determined by the switch configuration of the respective switching devices. In the embodiment illustrated, in which the energy storage blocks already have a permanently provided series connection the electric configuration is adjustable by closing only one of the switching elements 121 and only one of the switching elements 122. That is, the electric configuration of the energy storage 190, that is, of its energy storage blocks, may efficiently be expressed by an array or a matrix, whose individual elements are represented by the switching devices 121, 122. This may also be understood such that, for instance, the conductor A of the terminal arrangement 110 is represented by a "vector" whose components correspond to the individual switching elements and may assume the value 0, i.e., the switch is open, and 1, i.e. the switch is closed with the constraint that only a single component of the corresponding vectors has the value "1" at any given point in time. The same holds true for a corresponding vector of the conductor B, wherein it is again to be noted that in some embodiments in transient phases the corresponding switching devices may also have an intermediate state in which an energy flow may occur in only one direction. A corresponding array or vector whose components may assume only the states "0" and "1" therefore indicate states in which the respective switching devices are fully closed or fully open. During certain switching phases a switching device, however, may be in an intermediate state, while another switching device may have already assumed its fully open or fully closed state or may also be in an intermediate state. Respective time charts for activating the switching devices are described in more detail later on.

FIG. 1B shows a corresponding illustration that represents an electric configuration of the energy storage 190 of FIG. 1A. Respective "vectors" or rows of a matrix referred to as A and B correspond to the respective switch positions of switches connected to the respective conductors A and B of the terminal arrangement 110. In the representation of FIG. 1B there is described an electric configuration, in which the switching element 121-1 is closed, that is, the second component of the vector assigned to the conductor A has the value "1" and is also, as discussed above, the only component having this value. The row or vector assigned to the conductor B has as the only "1" the first component that corresponds to the switching device 122-0 so that the minus pole of the storage block 190-1 is connected with the conductor B and the plus pole of the energy storage block 190-1 is connected with the conductor A. Therefore, at the terminal arrangement 110 a rated voltage is available that corresponds to the rated voltage of the storage block 190-1.

As already discussed the actual connection voltage may depend on the state of charge and the load.

FIG. 1C illustrates the representation of a further electric configuration that substantially results in the same rated voltage at the terminal arrangement 110 when the same type of storage blocks is used, wherein, however, in this case the switching devices 121-3 and 122-2 are closed so that a corresponding energy input or energy output is accomplished by means of the energy storage block 190-2.

FIG. 1D illustrates of the representation of an electric configuration, for which the maximum rated voltage is present at the terminal arrangement 110, since the switching devices 121-N and 122-0 are closed. If the conductor B is considered as a reference potential in the example illustrated, the maximum positive rated voltage is obtained at the terminal arrangement 110.

FIG. 1E illustrates the representation of an electric configuration which results, for the above-identified convention, in the maximum negative rated voltage, since in this case the switching device 121-0 and the switching device 122-N are closed.

During operation of the energy storage 190 the controller 130 outputs the control signal SA, SB in an appropriate form in order to provide the required rated voltage and thus the connection voltage at the terminal arrangement 110 by adjusting or setting the appropriate configuration. For example, it may frequently be necessary to supply a load with a relatively constant voltage throughout the entire lifetime of the energy storage 190. In this case the controller 130 may provide the rated voltage such that substantially the desired connection voltage is provided, even if the state of charge varies. For example, the maximum number of energy storage blocks is selected such that the minimum required connection voltage is obtained even for a correspondingly low state of charge, as already discussed above, wherein the gradation between individual voltage steps substantially corresponds to the momentary voltage of an individual energy storage block. For determining the current connection voltage, for instance, a voltage sensor (not shown) may be provided across the conductors A and B that is connected with the controller 130, thereby making a corresponding voltage value available in a continuous manner or at discrete time intervals. In other embodiments at least in some of the conductors of the terminal arrangement 110, in the embodiment shown for instance at the conductor A, a current sensor is provided so that incoming or outgoing currents may be detected by the controller 130 continuously or at certain time intervals. In particular, by one or more corresponding current sensors a charge balance may be determined for each individual energy storage block and this charge balance may be taken into consideration upon selecting an appropriate electric configuration for providing the desired connection voltage, as will also be described later on in more detail.

For example, if a certain rated voltage is to be provided at the terminal arrangement 110, wherein the required rated voltage may be provided by the controller 130 on the basis of an internally implemented algorithm or may be represented by one or more externally supplied parameters, the corresponding electric configuration may be selected under consideration of the state of charge or the charge balance of the individual energy storage blocks, by outputting the corresponding control signal. In this case, the electric configuration may be changed in a time-dynamic manner, if this is required or appropriate in view of the load connected to the energy storage. For example, the connected load may be a DC voltage source, such as a photovoltaic module or an array of photovoltaic modules so that the amount of energy that may be received from these modules may strongly depend on the momentary state of the photovoltaic generator. By adapting the connection voltage the energy storage 190 may be adapted to the momentary state of the photovoltaic generator so as to receive an optimum amount of energy for the momentary state. To this end, a certain range of connection voltages may be scanned through on a regular basis or upon occurrence of a corresponding change of current and/or voltage at the terminal arrangement 110, wherein the corresponding current flow and possibly also the actually obtained connection voltage are measured. A rated voltage that results in a highest flow of energy may then be determined as the currently valid rated voltage and may be stored; the corresponding electric configuration(s) are then adjusted so as to correspond to this current rated voltage. In this manner, an energy input as high as possible may be guaranteed for the energy storage 190 even for varying external conditions.

Upon coupling the energy storage 190 with a photovoltaic generator the characteristics of the photovoltaic generator may advantageously be exploited in order to obtain a state of charge for the individual energy storage blocks that in the long run is balanced as efficiently as possible. To this end, in times of high energy flow the controller may select that electric configuration that provides the required rated voltage and includes, for instance, possibly one or more of energy storage blocks having a relatively low state of charge. Due to the permanent series connection of the energy storage blocks 190-1, ..., 190-N in this embodiment and depending on the overall number of energy storage blocks provided a certain imbalance may nevertheless occur. In phases with low energy input or, if required, even in phases with relatively high energy flow the photovoltaic generator may be connected with an energy storage block having a low state of charge if a relatively significant imbalance is determined among the individual energy storage blocks; in this case the voltage of the photovoltaic generator may adjust to the corresponding connection voltage without a significant change of the current flow. Although in this case the energy flow may be reduced, the total energy harvesting according to this concept may not be significantly affected, since only phases of reduced solar radiation or relatively short time intervals may be taken into consideration.

In further embodiments the controlling of the switching assembly 120 by the controller 130 is accomplished such that an output voltage of varying polarity is available at the terminal arrangement 110, if this is considered appropriate. For example, the operation of a DC machine may efficiently be controlled with respect to direction and speed by outputting a corresponding DC voltage having appropriate polarity. A corresponding parameter for the operation of the electric machine may be supplied to the controller 130 from an external source, or in other cases the parameter(s) may be generated internally, when the controller 130 has access to the required information for determining the desired temporal behaviour of the electric machine connected to the energy storage. It should be appreciated that a full 4 quadrant operation of the connected DC machine is feasible if the energy storage 190 is configured for an energy flow in both directions, i.e., the energy storage blocks are able to receive energy and to output energy. That is, the DC machine may be operated in both directions in a driving and driven manner.

In many applications involving the usage of electric machines typically machines are used that require an electric rotating field, such as brushless DC motors, synchronous machines, asynchronous machines, reluctance machines and the like. To this end, appropriate electronic controllers, so-called inverters, are used that produce the required AV voltages from a rated input voltage, wherein frequency and amplitude of the AC voltages vary corresponding to the state of the electric machine. In this context it should be appreciated that respective inverters may also be provided with highly complex control mechanisms in order to facilitate highly dynamic applications, for instance in the form of vector control and the like. Typically in this case switching elements are provided for generating appropriate voltages from a given rated input voltage, by typically switching the motor inductors with relatively high clock frequencies in the range of several kilohertz up to 20 kHz. Although inverter topologies exist, in which a variable intermediate circuit voltage is provided, thereby merely requiring the output transistors to switch the current intermediate circuit voltage across the motor inductors, nevertheless a separate buck-inverter stage is required, which in turn necessitates the provision of a further inductance and corresponding switching elements. In some embodiments of the present invention the energy storage 190 may adopt its rated voltage appropriately to the magnitude requested by an inverter so that the power output stage of the inverter is operated with a rated voltage that is merely required for the current operating state is of the electric machine. In this manner, switching losses in the inverter and magnetising losses in the motor in combination with voltage spikes particularly resulting from the usage of relatively high clock frequencies in the context of a fixed high intermediate circuit voltage may significantly be reduced.

In further advantageous embodiments the controller 130 is configured to adjust the rated voltage at the terminal arrangement 110 in a highly dynamic manner, for instance, such that the polarity and the magnitude of the momentary rated voltage are changed so as to obtain the characteristics of an AC voltage. For example, the controller 130 may evaluate internally generated or stored or externally supplied parameters, which indicate the characteristics of the "AC voltage" to be generated. For example, if an AC voltage with relatively constant frequency and relatively constant amplitude is to be generated a corresponding electric configuration is selected within respective time intervals, such as regular intervals, so as to correspond to the currently required polarity and magnitude of the AC voltage to be generated. The selection of the current rated voltage may be accomplished in relation to the desired signal wave, for instance a sinusoidal signal wave, so that the connection voltage correspondingly varies in time. The smallest possible voltage difference between two different current rated voltages corresponds to the rated voltage of an individual energy storage block and may, for instance, be 1.2 V for accumulator cells based on nickel metal hydride, approximately 2 V for a lead-based accumulator, about 3.6 V for accumulators based on lithium ions and the like. If any harmonics resulting from the gradation of the respective voltage steps are considered inappropriate a suitable filter (not shown in FIG. 1A) may be used in order to smooth the time-varying output voltage. A corresponding control of the switching assembly 120 in the presence of an output filter, which may possibly also comprise inductive components, will be described later on in more detail.

In advantageous embodiments the AC voltage generated at the terminal arrangement 110 is appropriate for forming an electric power grid such that, AC loads may directly be connected to the energy storage 190. Furthermore, coupling to an already existing AC power grid is a further option so that the energy storage 190 may be charged in phases of excess energy in the power grid, wherein the controller 130 may select the momentary polarity and magnitude of the selected rated voltage such that a desired current flow for charging the storage blocks that are part of the momentary electric configuration, is achieved. In phases at which an external grid is not present the corresponding discharging may result in the provision of an AC voltage. For instance, the external power grid may be connected to the terminal arrangement 110 by means of a switching device (not shown) such that for a low state of charge or for high energy demand at the terminal arrangement 110 the external power grid and the provision of the AC voltage may be accomplished in a synchronous manner. For example, in this case the external power grid and the storage 190 may output energy, energy from the external power grid may be input into the storage 190 and at the same time a connected load may be supplied, or the external power grid may be switched off and the load may exclusively be supplied with energy from the energy storage 190.

As already discussed above in advantageous embodiments an energy balance of the state of charge, for instance based on incoming and outgoing currents, for each energy storage block may be determined by the controller 130 so that for a given required current rated voltage an appropriate electric configuration is selected. For example, for an AC voltage, in particular during time periods, at which the momentary voltage is significantly less compared to the maximum amplitude, there are available a plurality of possible electric configurations that provide the same rated voltage so that at least a certain level of balancing of the states of charge may be accomplished by appropriate selection of the electric configurations. A corresponding balancing of the states of charge may be accomplished, if possibly occurring differences in the electric potential are not acceptable, by means and methods, as will be described later on in more detail.

FIG. 2A schematically illustrates an energy storage 290 according to the present invention comprising a battery management system 200 and energy storage blocks 290-0, . . . , 290-N according to the present invention. With respect to the energy storage blocks 290-0, . . . , 290-N the same criteria may hold true as are already discussed with respect to the energy storage blocks 190-0, . . . , 190-N. The battery management system 200 is configured in a similar manner as the battery management system 100 and thus comprises a terminal arrangement 210, a switching assembly 220 and a controller 230. The terminal arrangement 210 comprises, contrary to the embodiment illustrated in FIG. 1A, in addition to the conductors A, B further conductors C and D so that, for instance, two different connection voltages may be set, which are independent from each other. In the embodiment illustrated the switching assembly 220 is, however, configured such that the conductors C and D are permanently connected to a predetermined series connection of the energy storage blocks. In the embodiment illustrated the maximum possible rated voltage is obtained as the connection voltage for the conductors C, D, that is, all the energy storage blocks are connected in series. It should be appreciated, however, that any other selection of a series of energy storage blocks may be used. The embodiment shown in FIG. 2A, in which the terminal arrangement 210 provides a fixed predetermined connection voltage at the conductors C, D, is an example for an embodiment in which the number of required switching devices is minimal for providing at least a varying voltage across the conductors A, B and at least one further DC voltage. In other embodiments two or more variable connection voltages may be provided by appropriately configuring the switching assembly 220, as will be shown in embodiments referred to later on.

The battery management system 200 as shown in FIG. 2A and thus the energy storage 290 may be used for similar applications and may be operated with similar functions, as is also already described for the battery management system 100 and the energy storage 190. However, the option of providing a second connection voltage at the terminal arrangement 210 results in a significantly higher level of flexibility during the use of the system. In some embodiments the energy storage 290 is configured to supply two different loads, for instance based on the fixedly adjusted rated voltage across the conductors C and D for a load that requires a corresponding "constant" output voltage, as may be the case for inverters, if an electric power grid is to be operated by an inverter. For example, many existing photovoltaic systems are already equipped with inverters that guarantee an optimal adaptation of the photovoltaic generator to the existing ambient conditions, whereas the inverters' output voltage is generated, however, such that the output voltage may be fed into an existing AC power grid. For such applications the controller 230 may provide an AC voltage across the conductors A and B that may serve as a guiding field for the connected inverter of the photovoltaic generator so that in particular already existing generators may readily be connected to the energy storage 290. To this end, the control by the controller 230 is accomplished such that a substantially constant amplitude and frequency are provided, while the inverter, as it already does in an existing AC power grid, controls the energy flow by modulating its output AC voltage. As already discussed, suitable filters may be used in order to efficiently reduce potential harmonics in the output voltage of the energy storage 290.

On the other hand, the constant or nearly constant connection voltage across the terminals C and D may be used for other purposes, such as operation of an inverter which may independently supply a power grid such as in island systems, emergency power systems, and the like. In other embodiments the constant voltage across the terminals C and D may, for instance, be coupled to an inverter or a different load configured for the operation within a voltage range corresponding to the state of charge, while the terminals A and B of the terminal arrangement 210 are coupled with an energy source, such as photovoltaic generator, a wind power station, and the like wherein in some cases these energy sources may output an AC voltage, as is discussed in the previous embodiment, whereas in other embodiments these sources preferably output a DC voltage. In particular, upon coupling a wind power station or a photovoltaic generator to the energy storage strongly varying output powers that depend on the changing external conditions are to be dealt with. For example, the connection voltage across the terminals A and B may be adjusted in correspondence to the requirements of a photovoltaic generator, as is also discussed above, in order to obtain an energy input as high as possible for the energy storage 290. In this case, also states of charge may efficiently be taken into consideration and may be balanced, as described above. For example, the corresponding DC voltage generator may be coupled to an energy storage block having a low state of charge so that specifically the corresponding energy balance may be adapted. In particular, by using a photovoltaic generator a connection to a single energy storage block is non-critical.

In other embodiments the terminals A and B are at least temporarily connectable with an energy storage, such as a capacitor, thereby allowing the capacitor to be connected to respective energy storage blocks on a regular basis or at appropriate points in time to perform, in total, a charge balancing. For instance, to this end an appropriate capacitor of a filter (not shown) may be used while preferably a load otherwise being connected to the terminals A and B is disconnected, or a special energy storage, such as a capacitor having high capacitance, is connected while a load is disconnected. During this charge balancing energy may be output or input via the terminals C and D.

Figure 2B:
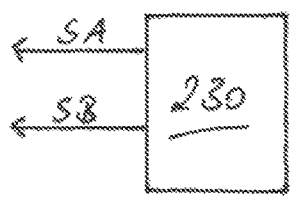
FIG. 2B illustrates an example of an electric configuration.

FIG. 2B illustrates a representation for the electric configuration of the energy storage 290 and its battery management system 200, respectively, wherein a fixed setting is provided for the "vectors" C and D, while a corresponding setting may be selected for the vectors A and B, which may be varied in a highly dynamic manner, as is also discussed above in the context of FIG. 1.

Figures 3A, 3B:
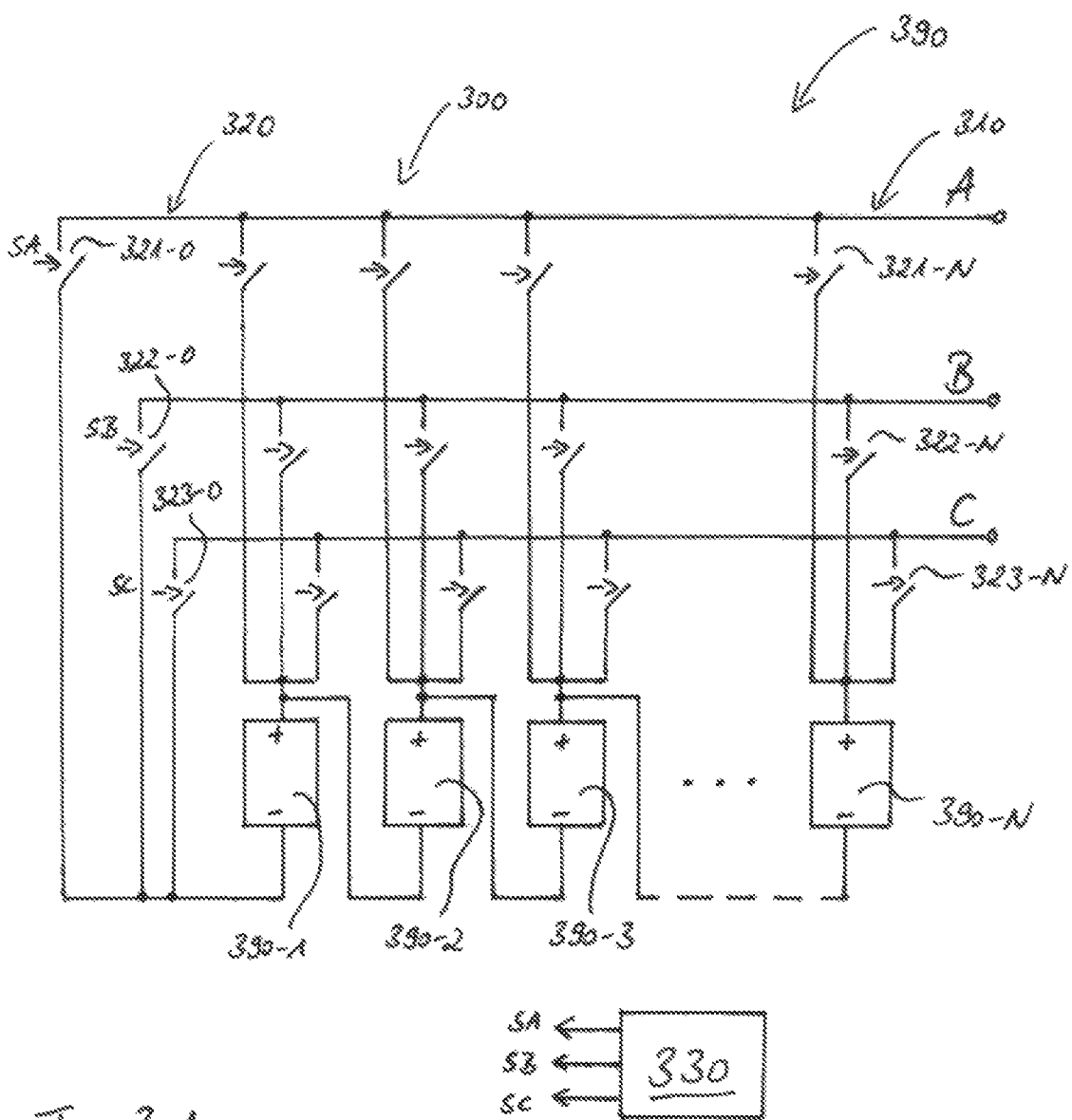
FIG. 3A shows a further embodiment of a battery management system and an energy storage.
FIG. 3B illustrates an exemplary electric configuration, FIG. 4A schematically illustrates an embodiment, in which the energy storage blocks are connectable in parallel and in series.

FIG. 3A illustrates a battery management system 300 that forms together with energy storage blocks 390-1, . . . , 390-N an energy storage 390 according to a further illustrative embodiment of the present invention. The battery management system 300 comprises a terminal arrangement 310 including, in the embodiment shown, three conductors or terminals A, B and C, which in turn are connected with a switch assembly 320. The switch assembly 320 comprises respective switching devices, which are connected, on the one hand, with the conductors A, B and C and, on the other hand, with the energy storage blocks 390-1, . . . , 390-N. In the embodiment shown the energy storage blocks in turn are provided in the form of a permanent series connection as already discussed above in the context of the previous embodiments. The switch assembly 320 thus comprises switching devices 321-0, . . . , 321-N connected to the conductor A, switching devices 322-0, . . . , 322-N corresponding to the conductor B and switching devices 323-0, . . . , 323-N corresponding to the conductor C. The switching devices are driven by a corresponding control signal having the components SA, SB and SC, which are provided by a controller 330. With respect to the switching devices, their controlling and the like the same criteria apply as previously discussed in the context of the embodiments of FIGS. 1 and 2.

In the embodiment shown the terminal arrangement 310 may therefore provide several connection voltages or rated voltages resulting from the corresponding selected electric configuration. As discussed above, corresponding DC voltages may be provided between the individual terminal A, B and C, possibly in a time-varying form, as is also discussed above. In advantageous embodiments the controller is configured to allow the provision, at least temporarily, of respective AC voltages, which in advantageous embodiments may be provided as a 3-phase power grid and therefore have a mutually fixed phase difference.

FIG. 3B illustrates the representation of an electric configuration that is again represented by the rows or vectors A, B and C, thereby resulting in a corresponding associated constellation of output voltages at the respective terminals A, B and C. That is, the electric configuration is adjusted so as to correspond for a given point in time to a desired voltage between the individual terminal A, B and C in order to meet the corresponding requirements. For forming a 3-phase power grid, for example, in certain time intervals the electric configuration is set so as to correspond to the individual phase voltages of a 3-phase power grid, such as a sinusoidal 3-phase power grid. In the subsequent time interval the electric configuration is adjusted so as to correspond to the phase voltages at this next point in time, and so on, so that corresponding phase voltages are obtained over time. For example, a predetermined number of sample points may be selected, for which the phase voltages are known and may be used as target values for the selection of the corresponding electric configuration. The number of sample points may be dynamically changeable. Also in this case corresponding filters may be used so as to significantly reduce possibly generated harmonics. Also in this case it is possible, on the basis of the known momentary electric configuration, for instance using the vectors A, B and C, and respective current measurement values, to determine a precise balance of incoming and out going currents and thus charges, thereby ensuring that the state of charge of each individual energy storage block is known at any point in time. Also in this case several electric configurations may be selectable for the according constellations of voltages so that the even during operation a certain level of "balancing" of the states of charge is achievable by selecting the appropriate electric configuration. A further balancing of charges may, for instance, be accomplished by successively coupling an energy storage element, such as a capacitor, to the respective energy blocks in times, in which a load is decoupled, thereby successively levelling the balance of the individual energy storage blocks. In embodiments, in which a filter element including a capacitor is used, this capacitor may additionally be used for providing for a certain level of charge balancing. Respective strategies for obtaining a desired level of balancing of the states of charge will be described in more detail later on.

In advantageous embodiments the controller 330 is appropriately configured to provide an AC power grid and to temporarily vary its frequency and/or amplitude in a desired manner. Frequently electric machines, such as brushless DC motors, synchronous machines, asynchronous machines, reluctance machines and the like are operated in combination with an energy storage, for instance in mobile applications, such as an electric vehicles and the like, but also in stationary applications, for instance when the electric machine has to be operated even when an external power grid fails or when the electric machine is part of a generator device, such as in a water power plant, a wind power station, and the like and varying operating conditions may frequently occur. In order to allow a dynamic operation of the electric machine in one embodiment the controller 330 is configured, for instance on the basis of externally supplied parameters and/or on the basis of internally generated or stored parameters, to control the state of operation of the electric machine by appropriately adjusting the connection voltages. A simple possibility of adjusting the state of operation of an electric machine is the adjustment of the frequency and the amplitude such that a desired speed and a desired torque are obtained. For example, amplitude and frequency may be varied in a wide range in proportion to each other so as to obtain a speed variable operation with a substantially constant torque, as is also known for frequency inverters of electric machines. However, any other dynamic control algorithms may be applied so as to provide the required voltages at the terminals A, B and C in a highly dynamic manner, thereby adjusting the requested machine state. Also in this case the energy flux is adjustable in both directions for each direction of rotation of the corresponding electric machine. By implementing the control strategy that, among others, enables the operation of a speed variable electric machine the losses in particular within the motor may significantly be reduced compared to conventional energy sources and inverters and possibly the switching losses may also be lower compared to conventional inverters. Moreover, the voltage peaks caused by the switching processes may possibly be significantly less pronounced, since only the switching between adjacent voltage levels is performed contrary to the switching of the entire battery voltage, as is typically the case in conventional electric drives. In particular it is to be noted that also other desired wave forms of the voltage may be adjusted, for instance in order to increase the utilisation of the available maximum rated voltage in mobile drives, such as a wave form of the voltage that contains the third harmonic, and the like.

Moreover, the terminal arrangement 310 may also be connected to an external 3-phase power grid and the controller 330 is configured to execute a control procedure that, for instance, allows energy flux from the external power grid into the energy storage 390 or an energy flux in the reverse direction. In this manner, the energy storage may be charged from the 3-phase power grid without requiring any further rectifying or voltage adapting components. In particular for a certain configuration of the corresponding external 3-phase power grid a charging of the energy storage 390 may be achieved without the usage of rectifying components so that in particular in mobile applications, for instance for electric vehicles, increased efficiency may be achieved. The terminal arrangement 310 may also be used to perform charging and discharging in the form of a DC voltage, wherein, advantageously, any loads may be disconnected by means of switching devices that are not shown. It is generally advantageous as with any of the embodiments explained so far that a charging of the energy storage may be accomplished in principle with an arbitrary AC voltage or DC voltage as long as the maximum voltage that is externally applied does not exceed the total final charging voltage so that an invalidly high current flow is avoided. When for instance the external voltage source provides a significantly lower voltage an appropriate electric configuration may be selected in order to charge or at least partly charge any storage blocks that are part of the selected elected configurations, while subsequently a different electric configuration may be selected, thereby gradually charging all of the storage blocks to the desired state of charge. Also in this case it is to be noted that a precise balancing on the basis of the respectively used electric configuration is guaranteed, wherein differences in the state of charge, which may possibly further exist, may be taken into consideration during the further usage and/or these differences may be balanced in specific operating modes of the energy storage by strategies as are already discussed or as will be described in more detail later on.

FIG. 4A illustrates a further embodiment of a battery management system 400 that forms an energy storage 490 in combination with energy storage blocks 490-1, ..., 490-N. Contrary to the embodiments described above in this case a switch assembly 420 comprises switching devices 423-1, ..., 423-N that connect at least some or, as in the embodiment shown, all of the storage blocks with each other such that upon closing the corresponding switching devices 423 a series connection of the storage blocks connected thereto is obtained. The switch assembly 420 further comprises switching devices 421-1, ..., 421-N and 422-1, ..., 422-N, which allow a connection of the respective storage blocks with a conductor or terminal A or B. Moreover, a controller 430 is provided that generates a control signal having corresponding components SA, SB, SC and that supplies the control signal to the switching devices in order to set a desired electric configuration. The switch assembly 420 as illustrated provides for an increased level of flexibility with respect to the adjustment of electric configurations, since also a parallel connection of all or at least some of the storage blocks may be obtained in various electric configurations. On the other hand, current flow through configurations having a plurality of storage blocks connected in series occurs via a plurality of electric switches so that possibly a somewhat higher total resistivity is obtained compared to a permanent series connection. With respect to the type of storage blocks, the switching devices and the further components substantially the same criteria apply as are also previously discussed.

FIG. 4B illustrates the representation of an electric configuration, in which the vectors or rows are illustrated that correspond to the terminals A, B and the switching devices 423, thereby obtaining, for instance, an electric configuration that corresponds to a parallel connection of all of the storage blocks. That is, the switching devices, corresponding to vectors A and B, i.e., the switching devices 421 and 422, are all closed, while the switching devices 423 corresponding to the vector Z are all open. Such an electric configuration is particularly advantageous in order to balance any existing differences in the states of charge between the energy storage blocks.

FIG. 4C illustrates a further example of an electric configuration for connecting in series the storage blocks 490-1 and 490-2 and connecting then to the terminals A and B, thereby obtaining a rated voltage that corresponds to twice the rated voltage of a single energy storage block. Due to the increased flexibility it is possible, as basically indicated, to connect in a series further subsequent groups of two storage blocks and connect them to the terminal arrangement 410, thereby obtaining, if required, a plurality of corresponding 2-blocks connected in parallel so that in this case a load for a single storage block is relatively low. Moreover, a certain degree of charge balance may occur. Moreover, the switch assembly 420 allows any desired number of storage blocks (≤N) to be connected in series, wherein any storage block may be the first storage block in a corresponding series connection due to the provision of the switching device 423-N. For example, if a series connection of three storage blocks is required, the last storage block 490-N may serve as the first storage block of the series connection, as is shown in FIG. 4D as an example.

FIG. 4D illustrates a representation of an electric configuration with the switching device 422-N being closed, the switching device 421-N being open and the switching device 423-N being closed so that a connection to the storage block 490-1 is established, whose switching devices 422-1 and 421-1 are opened, thereby disconnecting this storage block from the terminals A and B. The switching device 423-1 is also closed, thereby establishing a series connection to the storage block 490-2, whose switching device 422-2 is open and whose device 421-2 is closed. When the switching devices 421 and 422 of the remaining storage blocks, except for the last storage block 490-N, are open, the state of the switching device 423-2 is arbitrary. As discussed above, also in this case several 3-combinations may be connected in parallel. In highly dynamic applications requiring a change of the resulting connection voltage within short time intervals it may be advantageous to provide the corresponding series connections for obtaining the desired rated voltage only once and to circulate the configuration in a manner of a running light across all the storage blocks to possibly obtain a moderately equalised balance for the state of charge of all the storage blocks. It should be appreciated that for the switching devices 421, 422 and also for many of the switching devices 423 semiconductor devices may be sufficient that may be conducting in the reverse direction, if corresponding diodes connected in parallel are provided, as may be present as parasitic elements anyway in power MOSFETs. For one or more of the switching devices 423, such as the device 423-N, if provided, it may possibly be necessary to use a switch that blocks in the reverse direction, that is, a switch allowing to block current in both directions.

With reference to FIG. 5 detailed embodiments of the switching devices and strategies for switching between various electric configurations will be described.

Figure 5A:
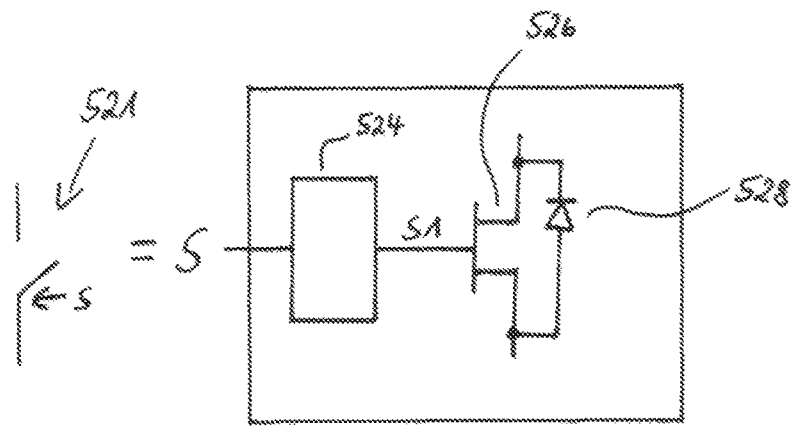
FIGS. 5A to 5C show embodiments of switching assemblies.

FIG. 5A illustrates a switching device 521 schematically shown on the left-hand side, which is, for instance, shown and described in the previous embodiments of the battery management systems 100, 200, 300, 400. The switching device 421 receives a control signal S, which in the embodiment shown includes at least the information whether the switching device has to be open or closed. The right-hand side of FIG. 5A schematically illustrates an embodiment that illustrates a switch element based on semiconductor technique 526, such as a power MOSFET in combination with a driver circuit 524 that generates a driving signal S1 that is appropriate for actually driving the element 526. In the embodiment shown the switch element 526 represents a semiconductor device that does not block the current in the reverse direction, since for this type of semiconductor device a "parasitic" diode 528 is necessarily present, thereby allowing a current flow in the forward direction of the diode when a sufficient voltage is applied across the element 526 so as to exceed the forward voltage of the diode. When using a bipolar transistor as the element 526, which may generally not be capable of receiving a high reverse voltage, and external diode may be connected in parallel as illustrated.

Also, IGBTs or any other semiconductor-based switch elements may be used. For the embodiment of FIG. 5A it is to be noted that the application of the switch elements illustrated may not be possible in embodiments that require a switch that blocks current in both directions. Generally the driver circuit 524 is configured such that depending on the type of supplied control signal S a signal S1 may be generated, wherein, for instance, transformers, galvanicly isolated voltage sources, opto-electronic devices, charge pumps and the like may be used.

Figure 5B:
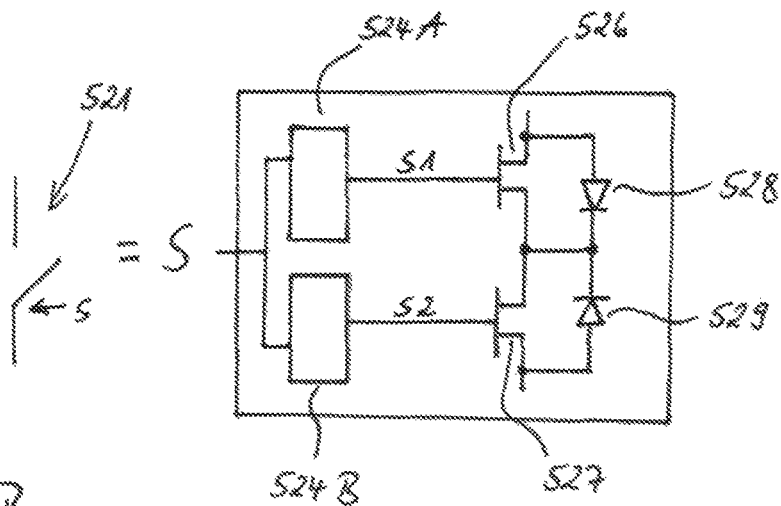

FIG. 5B illustrates the switching device 521 that allows blocking of current in both directions. To this end two switch elements 526, 527 are provided in the embodiment shown, wherein these elements are connected such that the corresponding parallel diodes may block a current flow in each direction. In the embodiment shown for example the respective drain terminals of the MOSFET transistors are connected to each other. The control signal S including the required information regarding whether and which of the switch elements 526, 527 is to be activated is supplied to the corresponding driver circuits 524A, 524B, which in turn are appropriately configured to provide the driving signals S1, S2. For example, it may be advantageous to simultaneously switch on both switch elements 526 and 527 so that the signals S1, S2 are generated in the respective appropriate manner. In other cases the two switch elements have to be driven at different points in time, wherein the corresponding information is also included in the control signal S and the circuits 524A, 524B may generate the signals in an appropriate manner so as to have the desired time-offset to each other.

Figure 5C:
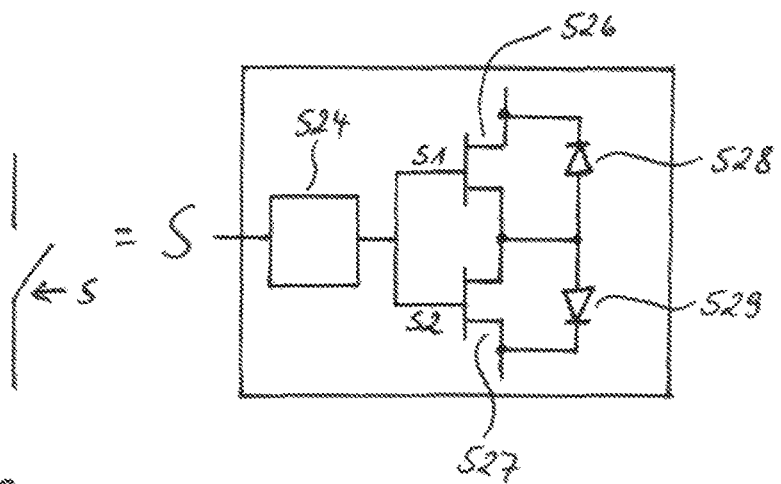

FIG. 5C illustrates the switch element 521 according to a further embodiment, where the source terminals of the switch elements 526, 527 are connected with each other so that the parasitic diodes 528, 529 block in both directions, wherein, however, if required a single driving signal may suffice to concurrently switch both elements 526, 527. In other cases the driving signals S1, S2, as discussed in the previous embodiment, may be provided by the circuit 524 so that a desired time-offset between the switching processes of the elements 526, 527 is achieved.

Generally it is to be noted that the switch elements 526, 527 are configured such that the maximum reverse voltage requirements and the required on currents are met. To this end, possibly a plurality of individual switch elements have to be connected in parallel and/or in series to meet these requirements. Moreover, the ohmic resistivity obtained thereby for a closed circuit is to be adapted in view of the requirements. For example, a plurality of MOSFET transistors may be connected in parallel without significant complexity in order to obtain a reduced series resistivity and to distribute the resulting thermal load to the plurality of elements. The corresponding circuits 524, 524A and 524B, respectively, are to be adapted with respect to the required drive currents.

Figure 5D:
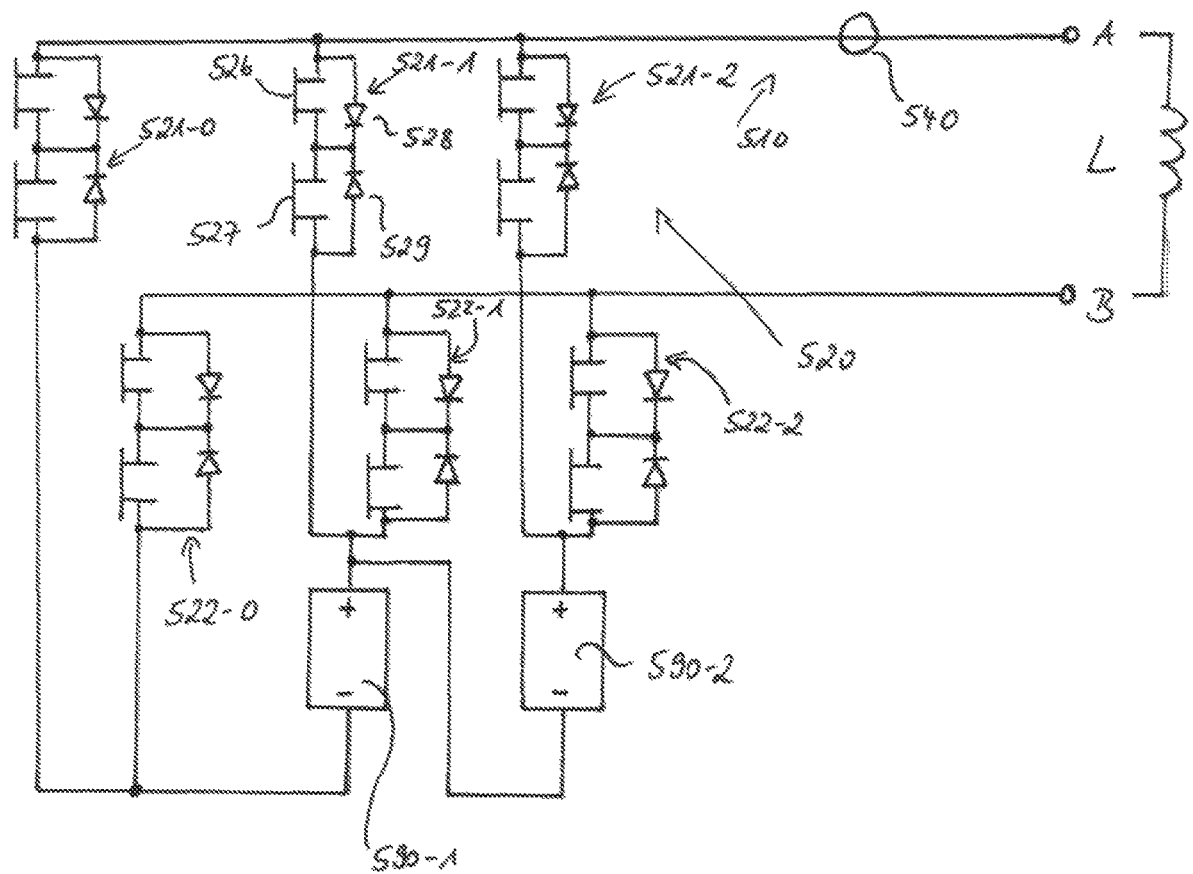
FIG. 5D illustrates a switching strategy for switching devices in a case, in which a current path is always required, for instance upon switching inductive components.

FIG. 5D illustratively shows a part of an electric energy storage including a battery management system according to the present invention, comprising a terminal arrangement 510 with terminals A and B and a switch assembly 520 that connects the terminal arrangement 510 with respective energy storage blocks, wherein, for convenience, merely storage blocks 590-1 and 590-2 are illustrated. The switch assembly 520 comprises switching devices 521-0, 521-1, 521-2 for connecting the energy storage blocks with the conductor or terminal A, whereas the energy blocks are otherwise connected in series. Moreover, switching devices 522-0, 522-1 and 522-2 are provided, which connected the storage blocks with the conductor or terminal B. The switching devices may have for instance, the configuration as illustrated in FIG. 5B, wherein, for simplicity, merely the switch elements and the corresponding "parasitic" diodes are schematically shown and the drive circuits for generating the drive signals are not shown. It may be assumed that the electric configuration corresponds to the representation as shown on the left-hand side with A: 010, B: 100, which is to be switched into the configuration A: 001, B: 100. That is, in the first electric configuration the rated voltage at the terminals A, B is equal to the rated voltage of the storage block 590-1 and this rated voltage is to be increased by connecting the two storage blocks in series. Moreover, it may be assumed that an inductive load L is connected to the terminal arrangement 510. The inductive load L may, for instance, represent a part of a filter device, a motor inductor, and the like. In this initial configuration the switching devices 521-1 and 522-0 are closed so that the block 590-1 is connected to the terminal arrangement 510, thereby supplying the load L. Moreover, at least one current sensor 540 is provided for detecting direction and magnitude of the current flow in at least one of the two conductors A, B. For the following consideration it may be assumed that current is injected into the load L. During the transition first the control signal (not shown) for the switching device 521-1 is output such that the lower switch element opens so that the momentary current flow transitions to the diode 529 connected in parallel, and the current is still injected into the load L, wherein in this consideration the voltage drop at the diode 529 is not taken into consideration. After a corresponding safety interval, which may take several nanoseconds up to several hundreds of nanoseconds, the control signal supplied to the switching device 521-2 is appropriately conditioned so that both switch elements may concurrently or subsequently be opened. In this manner, an increased voltage is present at the terminals A, B and the current will further be driven into the load L, wherein in this case a series connection of the two energy storage blocks serves as a voltage source. On the other hand, a potential short circuit of the storage block 590-2 by the switching device 521-1 is avoided, since the switch element 527 is already open, although the switch element 526 in combination with the diode 528 could conduct current, so that in total a current flow from the plus pole of the block 590-1 and hence to the minus pole of the block 590-2 is prevented, since the diode 529 is arranged in the reverse direction. Upon switching on the switching device 521-2 switching losses may be obtained, since the current in the diode 529 has to transition to the switching device 523-2, however these losses are moderately low due to the low difference of the voltage across the switch 521-2 when transiting from the fully open state into the fully closed state. Thereafter the switch 526 may be opened without producing any switching losses so that the switching device 521-1 is in its fully open state.

When the transition as described above occurs in a certain phase of operation and the load L drives current into the energy storage the control signal for the device 521-2 is provided such that in a first step the switch element 527 is switched, i.e., closed, so that a current path for the current from the inductor the to the plus pole of the storage 590-2 exists, however, a current is prevented from flowing out of the block due to the still open switch element 526 and the reverse-biased diode 528. After a certain safety time the switching device 521-1 may be fully closed, which may be accomplished by a concurrent driving or by a temporally offset driving, wherein now the current driven by the inductance L transitions fully to the diode 528 and the switch 527 that is already closed. Thereafter also the switch element 526 may be controlled so as to fully close the switching device 521-2.

By using the above described switching scheme and by being aware of the current direction the corresponding individual switch elements in the switching devices may appropriately be controlled so that there is always a current path, if required, when inductive components are present in the load. In other embodiments the switching devices may be controlled so that for each switching process a complete opening or closing is accomplished, if corresponding current paths have not to be provided or are provided by other components, for instance additional capacitors, and the like, or when no inductive components are present.

Figure 5E:
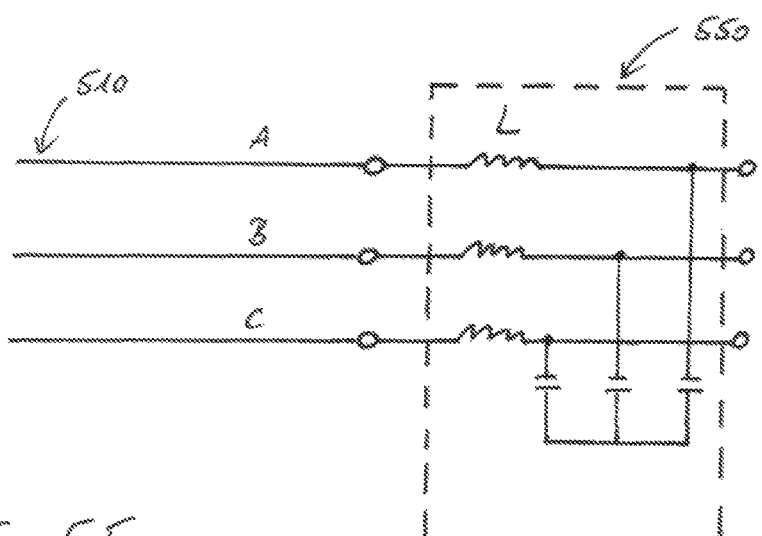
FIG. 5E shows a configuration including three terminals and a filter element.

FIG. 5E schematically illustrates a terminal arrangement 510 of an energy storage of the present invention, wherein in this embodiment three terminal or conductors A, B, C are provided so as to supply corresponding phase voltages, for instance in the form of a 3-phase power grid, as already discussed above. Moreover, a filter element 550 is schematically illustrated comprising an inductor L and a capacitance C for each of the phases. By using such a filter potential harmonics may significantly be reduced, wherein invalidly high voltage peaks are suppressed by using the above described switching strategy, since a corresponding current path is provided during each switching procedure. Moreover, the capacitances C of respective two phases may be used as storage capacitors, for instance, when charge balancing has to be performed during certain operating phases. To this end an appropriate electric configuration is selected, in which, for instance, the terminal C is generally deactivated and the terminals A and B receive, for instance, alternately a rated voltage that corresponds to the maximum voltage; thereafter a configuration is selected in which the desired storage block receives the voltage of the capacitors C in order to output charge. In this case, the inductors L serve to limit the current increase so that the differences in voltage between the corresponding storage block and the respective total voltage is not a problem. By detecting the corresponding currents the switching may be accomplished, if required, in such a way that the transition between configurations occurs at a zero crossing of the corresponding current. For example, the configuration may be selected, in which the desired number of storage blocks, such as the maximum number of storage blocks, is connected with the terminals A and C, thereby causing a current flow and thus increasingly charging the respective capacitances C. After the current flow has ceased a corresponding voltage is obtained across the capacitances C, which may, for instance, be greater than the total voltage of the storage blocks. At minimum current or zero current the switching may be accomplished so that the desired storage block is connected to the terminal A and C, thereby resulting in a discharging of the capacitors into the storage block via the inductors L, wherein again the switching or turning off may be accomplished at a low current or zero current. A load that may be connected to the terminals A, B, C may possibly stay connected, for instance when representing an inductive load, such as an electric machine, so long the corresponding magnetising losses and ohmic losses caused by the current flow through the two motor inductors are considered irrelevant. In other cases the corresponding load may be disconnected by appropriate switching devices (not shown). In other embodiments a further storage element instead or in addition to the filter 550, such as a capacitor having an appropriate capacitance, may be connected to respective two of the terminals A, B, C by means of a switching device in order to specifically transfer charge, for instance from the storage block having the highest state of charge to the storage block having the lowest state of charge. Also, strategies may be applied, in which successively each storage block is connected with the additional capacitor, thereby obtaining a charge balancing in the course of time.

Figure 6A:
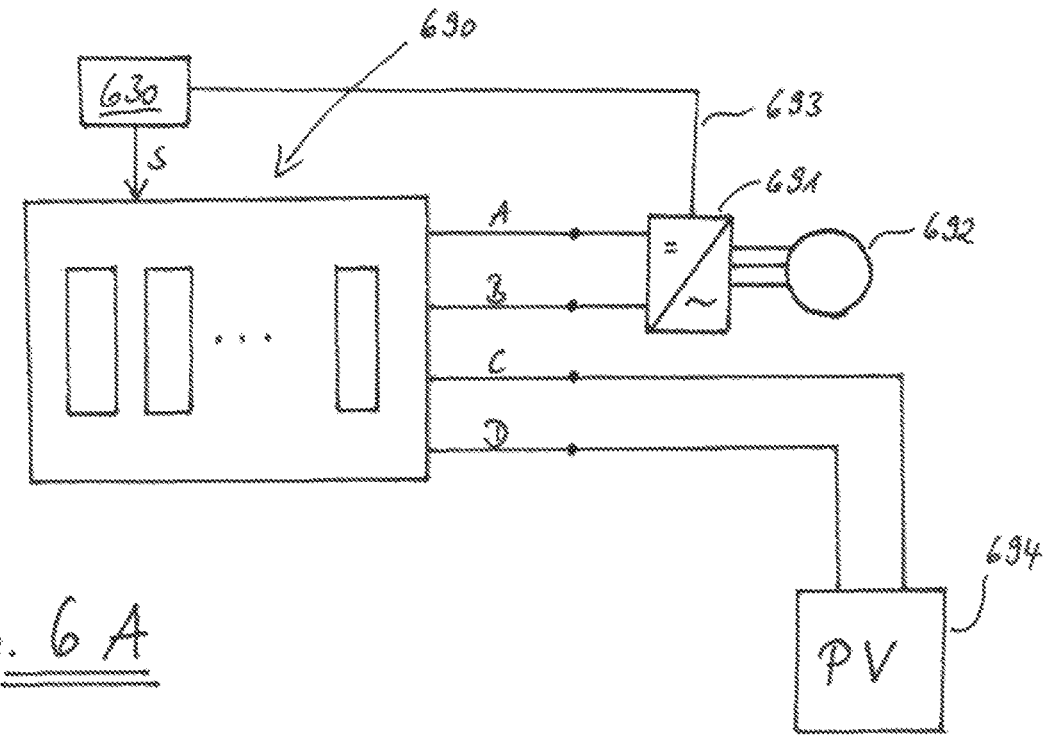
FIGS. 6A and 6B illustrate respective electric energy storages in combination with different loads, and FIG. 7 schematically illustrates a strategy for monitoring the state of charge of the individual energy storage blocks.

FIG. 6A illustrates an electric energy storage 690 according to one embodiment, in which two independent variable DC voltages are provided at terminals A, B, C, D. The energy storage 690 comprises a controller 630 that communicates with further components, in particular with a switch assembly, via a control signal, the controller being configured to connect, on the one hand, energy storage blocks included in the storage 690 with the terminals A, B and, on the other hand, with the terminals C, D, as is also discussed above in more detail. In the example shown a load 691 presented in the form of an inverter is connected to the terminals A, B and thus receives an appropriate intermediate circuit voltage on the basis of a request signal 693 supplied to the controller 630 in order to efficiently operate a speed variable electric machine 692. A further load 694 provided in the form of a photovoltaic generator is coupled to the terminals C, D, in the example shown, without any intermediate voltage converting components so that in total losses for generation, transfer and storage of energy generated by the generator 694 are maintained at a low level. As discussed above, in this case appropriate control mechanisms are implemented in the controller 630 for efficient utilisation of the energy provided by the generator 694, thereby potentially also enabling an efficient charging of individual energy storage blocks. For example, in time periods with relatively high energy production optimised electric configurations may be adjusted so as to allow as much energy to flow into the storage 690 as possible, while in other phases of operation specifically the charge balancing of the individual energy storage blocks may be performed, as is already discussed above.

It is to be understood that also other variants are contemplated, for instance an AC voltage with appropriate frequency and voltage may be provided at the terminals A, B, for instance for operating an electric AC loads, and the like, while the photovoltaic generator 694 may still supply energy to the storage 690 in an optimum manner. Also in this case the controller 630 is appropriately configured to select the required electric configuration and adjust this configuration by the control signal S in order to obtain the desired AC voltage at the terminal A, B.

Figure 6B:
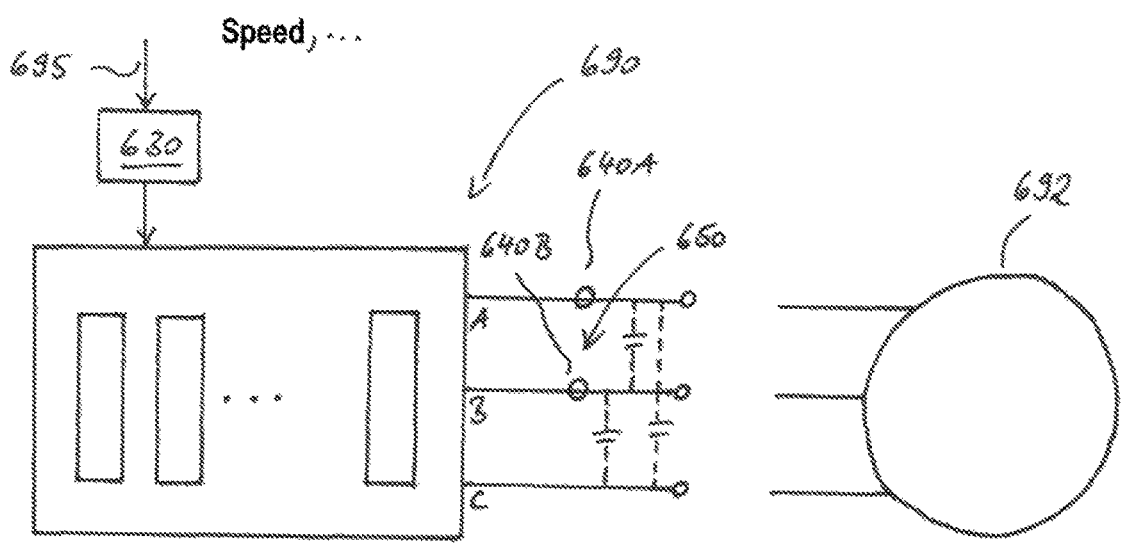

FIG. 6B illustrates a further embodiment of the energy storage 690 that may optionally include a capacitive filter 650 enabling, for instance, a switching strategy, in which the switching devices are completely closed or opened to provide a corresponding electric configuration, since even upon connecting an inductive component a current path is provided by the respective filter capacitors so that during short intervals during the switching procedure the occurrence of high voltage peaks may be avoided. The capacitances of the filter 650 may also be used for charge balancing, as is already discussed above. In the embodiment illustrated terminals A, B, C are provided, thereby, among others, enabling the provision of a 3-phase power grid that is appropriate for the operation of an electric machine 692. To this end, at least two current sensors 640A, 640B may be provided in order to enable a precise balancing of the corresponding phase currents and thus the corresponding currents of the individual storage blocks. In advantageous embodiments the controller 630 is appropriately configured to provide the phase voltages so as to meet the requirements of a desired state of operation of the electric machine 692, for instance with respect to speed, torque, and the like. To this end, the controller 630 receives a corresponding request signal 695, for instance for a desired speed, and the like, and determines an appropriate momentary electric configuration or a sequence of electric configurations, which result in the desired state of operation of the machine 692. For example, for the desired speed a corresponding constellation of phase voltages is determined for the machine 692 and the required electric configurations are selected for the corresponding time intervals so that in a respective time interval the required constellation of the phase voltages is obtained, as is also already discussed above. The required switching frequency may be set by the number of sampling points, that is, by the number of points in time, at which the selection of the electric configurations is accomplished by means of target voltage values.

Figure 7:
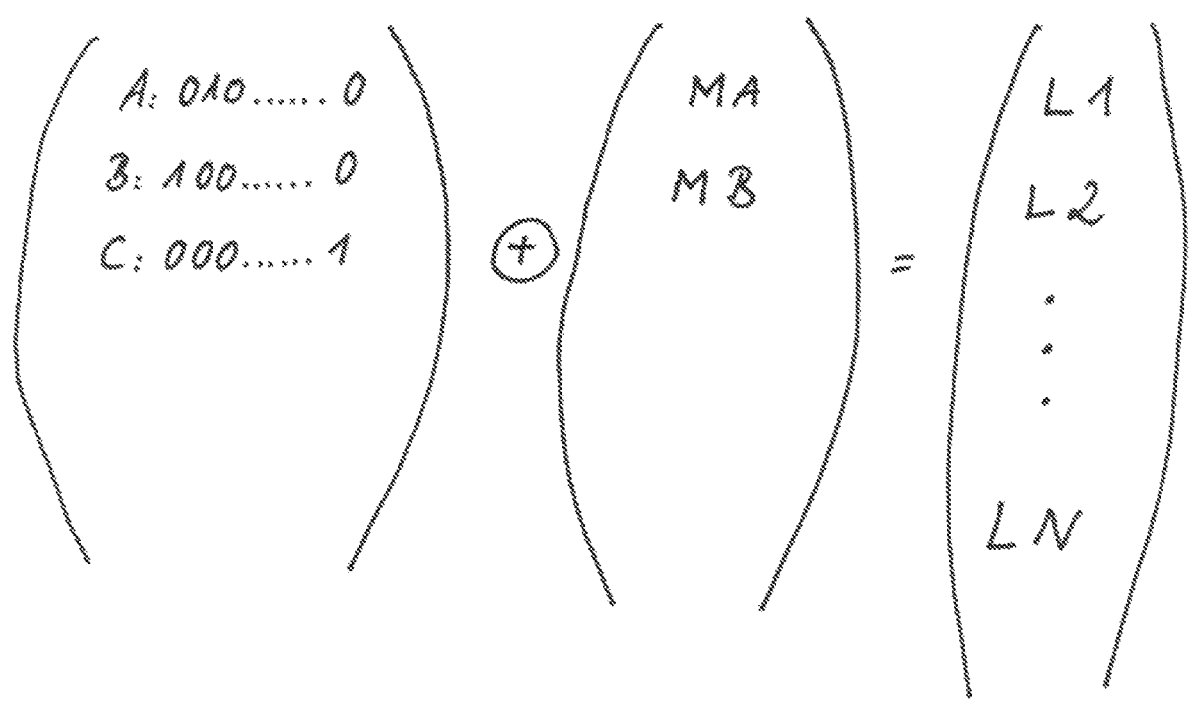

FIG. 7 illustrates a method for balancing the states of charge of the individual energy storage blocks. The balancing is accomplished on the basis of the currently prevailing electric configuration that is schematically known to the controller in the form of the rows or vectors or the electric configuration is adjusted by the controller, wherein, in the example shown in FIG. 7 the arrangement of FIG. 6B is used as a basis. That is, on the left-hand side the electric configuration is given by the rows or vectors A, B, C, as is also discussed in previous embodiments. It should be appreciated that for arrangements, in which a permanent series connection of all of the energy storage blocks is provided, the respective rows or vectors may include only one closed switch. Moreover, the controller receives information with respect to the momentary current at the respective terminals, wherein for the configuration of FIG. 6 only to current sensors may be sufficient, since the current flow in the further terminal may readily be calculated, since the sum of all currents has to yield 0. From the magnitude and direction of the corresponding phase currents and based on the knowledge regarding the corresponding electric configuration the controller may uniquely determined current flowing into the individual storage blocks or flowing out of the storage blocks and may thus determine a state of charge L1, . . . , LN for the storage blocks and may update these states for every newly received current value. The states of charge L1, . . . , LN determined from the configurations and current measurement values may, for instance, in some strategies be used for the selection of electric configurations for adjusting a desired connection voltage by selecting for energy flowing out of the storage those configurations, in which storage blocks of reduced state of charge are not involved. The states of charge L1, . . . , LN may particularly advantageously be used when specifically applying an external voltage and the like for actively balancing the states of charge. In other embodiments the states of charge may be monitored while, during operation or also during phases, in which no load is supplied, continuously charge may be exchanged between individual storage blocks by means of an additional capacitor, as is also discussed above. In the control procedure schematically shown in FIG. 7 the configurations of the vectors A, B, C, whether representing stored vectors or dynamically determined vectors, may be associated with current values MA, MB, that is, the currents in the current paths formed by the momentary configuration are determined and are stored in the form of appropriate numerical values L1, . . . , LN in the memory and are retrieved as needed.

As a result, the present invention provides a battery management system and an energy storage provided therewith, in which one or more voltages may be provided as needed by selecting an electric configuration of a switch assembly, wherein in illustrative embodiments also the state of charge of each individual energy storage block may be known and may serve as a basis for the selection of an appropriate electric configuration. The battery management system and in particular the switch assembly and the terminal arrangement are configured to convey any power as required during the operation of one or more external components. The battery management system of the present invention may particularly advantageously be applied in combination with stationary energy storages used, for instance, in private homes and in the industry for providing emergency power, to generally smooth load peaks in a power grid, to store self-generated current and reuse the same as needed, to implement appropriate electric power grids, and the like. In this case, it may be particularly advantageous to accommodate the battery management system of the present invention and the energy storage blocks in a shared environment, such as a casing, so that further components, such as a cooling system, and the like, may be shared by both components. Moreover, in mobile applications, for instance in electric vehicles, a higher level of flexibility is provided, since, for instance, generally the switching losses may be kept at a low level and optionally the stress of the motor caused by high switching voltages may be reduced. For instance, if an AC voltage having a frequency of up to 400 Hz is to be provided for a speed variable drive a switching frequency of 4 kHz is obtained when using, for instance, 10 sampling points per cycle, which is significantly less compared to the commonly used frequencies of up to 20 kHz. For applications, such as electric vehicles, by integrating the battery management system into the casing of the energy storage blocks the heat resulting from power losses may be directly used for heating the energy storage during permanent low environmental temperatures, while on the other hand for high temperatures the battery cooling system that is required anyway may concurrently efficiently allow dissipation of the power losses of the battery management system. In this case it is also advantageous that typically the switching devices may be distributed across the entire surface or volume of the energy storage blocks so that in total a significantly less critical thermal environment is obtained. The battery management system of the present invention provides for the possibility to charge and discharge, as required, the energy storage on the basis of AC voltage, DC voltage or with both types of voltages.

The terms "a" or "an" are used to refer to one, or more than one feature described thereby. Furthermore, the term "coupled" or "connected" refers to features which are in communication with each other (electrically, mechanically, thermally, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serve to refer to one exemplary embodiment of a claimed feature, and the claimed feature is not limited to the particular embodiment referred to by the reference indicia. The scope of the claimed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

As readily appreciated by those skilled in the art, the described processes and operations may be implemented in hardware, software, firmware or a combination of these implementations as appropriate. In addition, some or all of the described processes and operations may be implemented as computer readable instruction code resident on a computer readable medium, the instruction code operable to control a computer of other such programmable device to carry out the intended functions. The computer readable medium on which the instruction code resides may take various forms, for example, a removable disk, volatile or non-volatile memory, etc.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

The invention claimed is:

1. A battery management system, comprising:
a terminal arrangement connectable to an electric energy storage having a plurality of energy storage blocks, the terminal arrangement being configured for exchanging electric energy between the electric energy storage and one or more external components, at least one of which is an inverter of an electric machine, said inverter operating on the basis of a dynamic intermediate circuit voltage;
a switch assembly connected to the terminal arrangement and being connectable to each of the plurality of energy storage blocks, the switch assembly being configured to set an appropriate electric configuration of the energy storage blocks by means of a control signal so as to provide one or more rated voltages; and a controller configured to provide the control signal used for setting the electric configuration on the basis of the state of charge of the plurality of energy storage blocks and said dynamic intermediate circuit voltage.

2. The battery management system of claim 1, wherein the switch assembly is configured to set the appropriate electric configuration on the basis of a permanent or switchable series connection of the plurality of energy storage blocks.

3. The battery management system of claim 1, wherein the electric configuration of the plurality of energy storage blocks is set so as to concurrently provide two or more rated voltages at the terminal arrangement.

4. The battery management system of claim 1, wherein at least one of the one or more rated voltages at the terminal arrangement is a time-varying rated voltage.

5. The battery management system of claim 4, wherein the time-varying rated voltage has characteristics of an AC voltage.

6. The battery management system of claim 5, wherein two or more time-varying voltages are generated so as to be appropriate for operating an electric machine.

7. The battery management system of claim 1, wherein the controller is further configured to set the electric configuration on the basis of an operating state to be adjusted of the one or more further external components connected to the terminal arrangement.

8. An electric energy storage, comprising:
a plurality of energy storage blocks, each of which contains a portion of the electric energy of the energy storage; and
a battery management system including:
a terminal arrangement connected to the electric energy storage and being configured for exchanging electric energy between the electric energy storage and one or more external components, at least one of which is an inverter of an electric machine, said inverter operating on the basis of a dynamic intermediate circuit voltage;
a switch assembly connected to the terminal arrangement and being connected to each of the plurality of energy storage blocks, the switch assembly being configured to set an appropriate electric configuration of the energy storage blocks by means of a control signal so as to provide one or more rated voltages; and
a controller configured to provide the control signal used for setting the electric configuration on the basis of the state of charge of the plurality of energy storage blocks and said dynamic intermediate circuit voltage.

9. A method for operating an electric energy storage having a plurality of energy storage blocks, the method comprising:
determining one or more rated voltages of the electric energy storage for supplying one or more external electric components, at least one of which is an inverter of an electric machine, said inverter operating on the basis of a dynamic intermediate circuit voltage, one of the rated voltages corresponding to said dynamic intermediate circuit voltage as required for a current operating state of said electric machine;
by means of a switch assembly connected to the plurality of energy storage blocks, setting an electric configuration of the plurality of energy storage blocks on the basis of the determined one or more rated voltages and on the basis of the state of charge of the plurality of energy storage blocks; and
providing one or more connection voltages that correspond to the one or more rated voltages at a terminal arrangement connected to the switch assembly.

10. The method of claim 9, wherein the one or more rated voltages are determined on the basis of a desired or momentary state of operation of at least one of the one or more external components.

11. The method of claim 9, wherein the one or more external components additionally comprise at least one of a photovoltaic generator, an electric machine of a wind power station, an electric machine of a water power station, an electric drive machine and an electric AC power grid.

* * * * *